(12) United States Patent
Sesser et al.

(10) Patent No.: US 9,587,687 B2
(45) Date of Patent: Mar. 7, 2017

(54) VISCOUS ROTATIONAL SPEED CONTROL DEVICE

(71) Applicant: Nelson Irrigation Corporation, Walla Walla, WA (US)

(72) Inventors: George L. Sesser, Walla Walla, WA (US); Lee A. Perkins, Lowden, WA (US); Craig B. Nelson, Walla Walla, WA (US); Riley D. Greenwood, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 43 days.

(21) Appl. No.: 14/789,415

(22) Filed: Jul. 1, 2015

(65) Prior Publication Data

US 2016/0201743 A1 Jul. 14, 2016

Related U.S. Application Data

(63) Continuation of application No. 14/699,445, filed on Apr. 29, 2015.

(Continued)

(51) Int. Cl.
*F16F 9/12* (2006.01)
*F16D 57/00* (2006.01)
(Continued)

(52) U.S. Cl.
CPC ............ *F16D 57/007* (2013.01); *B05B 15/10* (2013.01); *B60T 10/02* (2013.01); *F16D 57/02* (2013.01); *A01G 25/092* (2013.01)

(58) Field of Classification Search
CPC ........ F16D 57/007; F16D 57/02; F16D 43/18; F16F 9/12; B05B 1/267; B05B 3/003; B05B 3/021
(Continued)

(56) References Cited

U.S. PATENT DOCUMENTS 2,942,711 A * 6/1960 Zindler ................... F16D 43/18
188/181 R
3,576,242 A * 4/1971 Mumma .............. B65G 13/075
188/185

(Continued)

OTHER PUBLICATIONS

XCAD USA website http://www.xcadusa.com/projects.html, Self-Governing Sprinkler, Nov. 2014.

*Primary Examiner* — Christopher Schwartz
(74) *Attorney, Agent, or Firm* — Nixon & Vanderhye P.C.

(57) ABSTRACT

A rotational speed control device maintains a shaft rotation speed. The device includes a housing containing a viscous fluid and a shaft disposed in the housing and rotatable relative to the housing. A rotor is coupled with the shaft for rotation in the viscous fluid. In one arrangement, the rotor is axially displaceable along the shaft between a low-shear position and a high-shear position. A spring mechanism is disposed in the housing and biases the rotor toward the low-shear position. In another arrangement, the rotor may be designed to cooperate with the housing or other nonrotating features within the housing to vary a shear gap according to radially expanding components of the rotor. The rotor, housing and spring mechanism can be designed to cooperate to create large changes in braking torque in response to small changes in shaft rotational speed. This allows the rotation speed to be controlled within a relatively narrow range.

16 Claims, 42 Drawing Sheets

Related U.S. Application Data

(60) Provisional application No. 62/103,168, filed on Jan. 14, 2015.

(51) Int. Cl.
| | | |
|---|---|---|
| *F16D 57/02* | (2006.01) | |
| *B60T 10/02* | (2006.01) | |
| *B05B 15/10* | (2006.01) | |
| *A01G 25/09* | (2006.01) | |

(58) Field of Classification Search
USPC ............ 188/290–296; 192/105 BA, 105 CD; 239/205, 252
See application file for complete search history.

(56) References Cited

U.S. PATENT DOCUMENTS

| | | | |
|---|---|---|---|
| 3,861,503 A | 1/1975 | Nash | |
| 3,971,463 A * | 7/1976 | Zindler | F16D 7/021 192/105 A |
| 4,231,237 A * | 11/1980 | Bochan | F16D 43/18 192/105 CD |
| 4,440,345 A | 4/1984 | Figwer et al. | |
| 4,660,766 A | 4/1987 | Nelson et al. | |
| 4,796,811 A | 1/1989 | Davisson | |
| 4,815,662 A * | 3/1989 | Hunter | B05B 3/005 239/205 |
| 4,819,779 A * | 4/1989 | Nickel | F16D 43/18 192/105 BA |
| 5,007,586 A | 4/1991 | Cohen | |
| 5,141,158 A * | 8/1992 | Allen | B05B 3/006 239/252 |
| 5,560,465 A * | 10/1996 | Zindler | F16D 43/18 192/105 BA |
| 5,909,848 A | 6/1999 | Zink | |
| 6,814,304 B2 | 11/2004 | Onofrio | |
| 6,864,591 B2 | 3/2005 | DeFrank | |
| 7,510,062 B2 * | 3/2009 | Derr | E05D 11/084 188/290 |
| 8,827,055 B2 * | 9/2014 | Winkler | B23Q 11/0092 188/110 |
| 2006/0113154 A1 * | 6/2006 | Hayashi | F16F 9/12 188/290 |
| 2012/0048651 A1 * | 3/2012 | Rinklake | A62B 1/10 182/234 |
| 2016/0201744 A1 * | 7/2016 | Sesser | F16D 57/02 188/296 |

* cited by examiner

US 9,587,687 B2

VISCOUS ROTATIONAL SPEED CONTROL DEVICE

CROSS-REFERENCES TO RELATED APPLICATIONS

This application claims the benefit of U.S. Provisional Patent Application Ser. No. 62/103,168, filed Jan. 14, 2015, and is a continuation of U.S. patent application Ser. No. 14/699,445, filed Apr. 29, 2015, the entire content of each of which is herein incorporated by reference.

STATEMENT REGARDING FEDERALLY SPONSORED RESEARCH OR DEVELOPMENT (Not Applicable)

BACKGROUND OF THE INVENTION

It is desirable to maintain a relatively constant speed of rotation of an irrigation sprinkler regardless of nozzle size or pressure (i.e., mass flow rate and fluid velocity). This invention results in a large increase in braking torque for a small increase in rotational speed and therefore minimizes the change in rotational speed of the irrigation sprinkler when nozzle size or pressure is changed.

For many years, a braking system has been in use for sprinkler deflector plates that utilizes a rotor that is immersed in a viscous fluid. The rotor is connected to a shaft which transmits the energy of the rotating sprinkler or deflector plate into the viscous-braking mechanism. The rotor, viscous fluid and a portion of the shaft are contained within a sealed housing. As the shaft and rotor rotate, the viscous fluid is sheared between the rotor and the housing. As the shear rate increases, the braking torque that retards the shaft rotation also increases. As a matter of operation, the shear rate increases due to an increase in the rotational speed of the shaft and therefore the surface speed of the rotor. As a matter of design, the shear rate can be increased by decreasing the gap between the rotor and the housing.

It is desirable to avoid requiring the shaft to move axially in and out of the housing. Axial movement can drag water and other contaminants into the seal and thereby cause water intrusion and/or excessive wear. Additionally, as the shaft moves into the housing, it pressurizes the fluid chamber, which can cause excess seal friction and seal wear unless an expansion chamber is added.

BRIEF SUMMARY OF THE INVENTION

In some embodiments of this invention, the gap between the rotor and the housing is changed automatically in response to changes in rotational speed of the shaft. The rotor is attached to the shaft in a manner that causes it to rotate with the shaft but allows it to move axially relative to the shaft. The rotor is designed with an impeller-like feature to create an axial force when it is rotated in the viscous fluid. The magnitude of the axial force is proportional to the rotational speed of the rotor. A spring mechanism is located within the housing in such a way as to resist the axial force of the rotor. The axial force of the rotor compresses the spring mechanism until the spring force matches the axial force being generated by the rotation of the shaft and rotor. These balancing forces are used to determine the axial position of the rotor within the housing.

When the rotational speed of the input shaft changes due to changing pressures or nozzle size of the sprinkler, the rotor moves to a new axial position. The rotor is designed to cooperate with the housing or other nonrotating features within the housing to vary the shear gap in response to the axial position of the rotor. The rotor, housing and spring mechanism can be designed to cooperate to create large changes in braking torque in response to small changes in rotational speed of the input shaft. This allows the sprinkler or deflector plate rotation speed to be controlled within a relatively narrow range.

Alternatively, the structure may be configured to use vanes to create radial movement rather than axial movement. Other alternate embodiments use mating threads working against either compression or torsional springs to create axial movement. Another alternate embodiment uses mechanical friction in addition to viscous fluid shear to create the braking torque.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
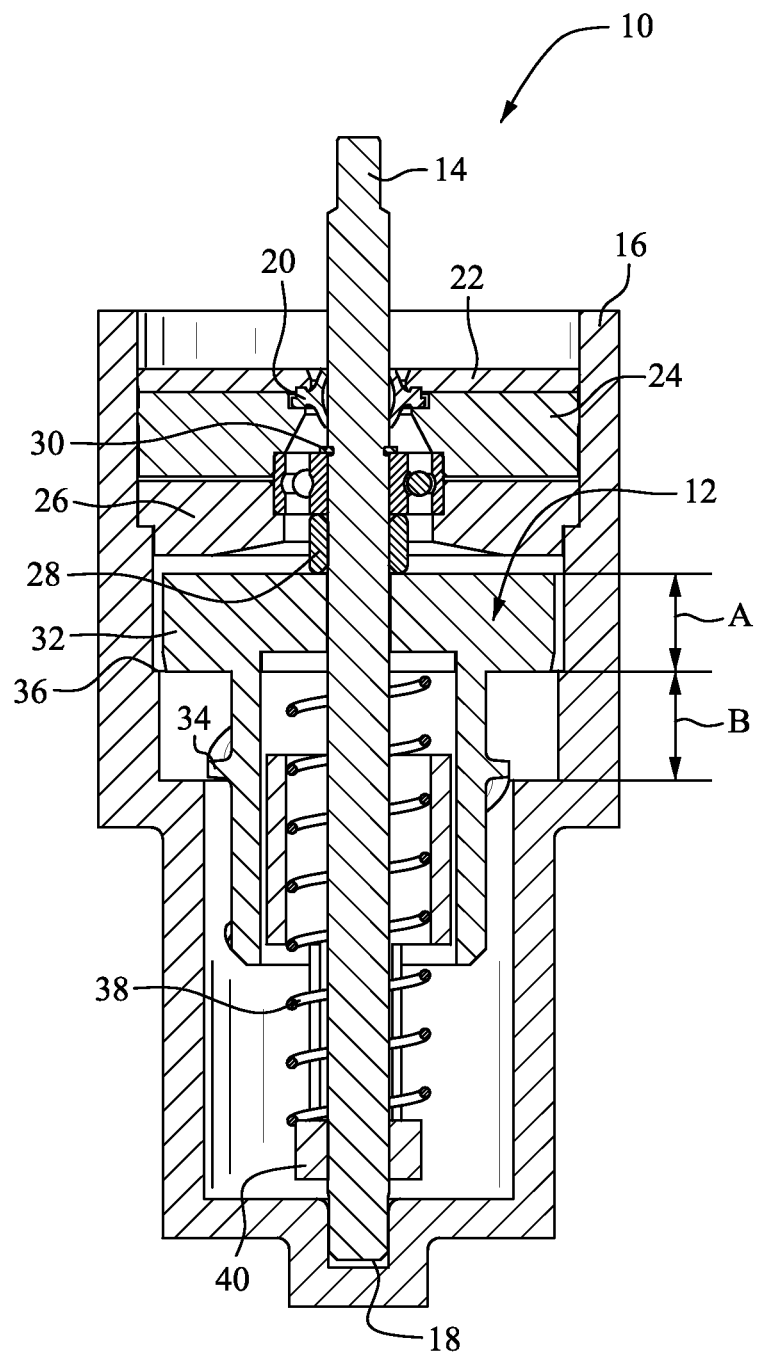
FIG. 1 shows an exemplary rotational speed control device in a low-braking stage.

The figures show several embodiments of a viscous rotational speed control device 10. With reference to FIG. 1, a rotor 12 is rotatable with a shaft 14 in a housing 16. The deflector plate 15 is secured to the shaft 14 for rotation with the shaft 14. (See, e.g., FIG. 15.) The housing 16 is filled with a viscous fluid such as high-viscosity silicone fluid or the like. The housing 16 is closed at a bottom end and includes a recess or channel 18 for receiving the shaft 14. A seal 20 secured with a seal retainer 22 contains the viscous fluid within the housing 16.

A retaining ring 30 and a bearing retainer 28 are used to axially locate the ball bearing on the shaft 14. A lower bearing support 26 and an upper bearing support 24 cooperate to axially and radially locate the shaft bearing assembly in the housing 16. FIGS. 1-10 and 13 utilize a ball bearing to support the axial and radial load that the water imparts on the shaft 14. The axial load is transmitted to the housing 16 via the lower bearing support 26.

The rotor 12 includes a braking section 32 and an impeller 34. The clearance between the braking section 32 and an inner wall of the housing 16 is directly related to the amount of braking. In section A shown in FIG. 1, the clearance between the braking section 32 of the rotor and the inner wall of the housing 16 is relatively large for low-braking. The inner wall of the housing 16 includes a step 36 that narrows the clearance between the braking section 32 of the rotor 12 and the inner wall of the housing 16. The smaller clearance provides for greater braking.

A spring mechanism such as a balancing spring 38 acts on the rotor 12 and urges the rotor 12 toward the high-clearance, low-braking position shown in FIG. 1. The balancing spring is secured via a spring retainer 40. As the shaft 14 and rotor 12 are rotated, the impeller 34 drives the rotor axially against the force of the spring 38. The clearance between the impeller 34 and the inside wall of the housing 16 is relatively small to enable the impeller to more effectively drive the axial position of the rotor 12. The axial force of the rotor 12 compresses the spring 38 until the spring force matches the axial force being generated by the rotation of the shaft 14 and rotor 12. When the rotational speed of the input shaft 14 changes due to changing pressures or nozzle size of the sprinkler, the rotor 12 moves to a new axial position. The spring mechanism may comprise any suitable structure for providing the bias, for example, opposing magnets or equivalent structure.

Figure 2:
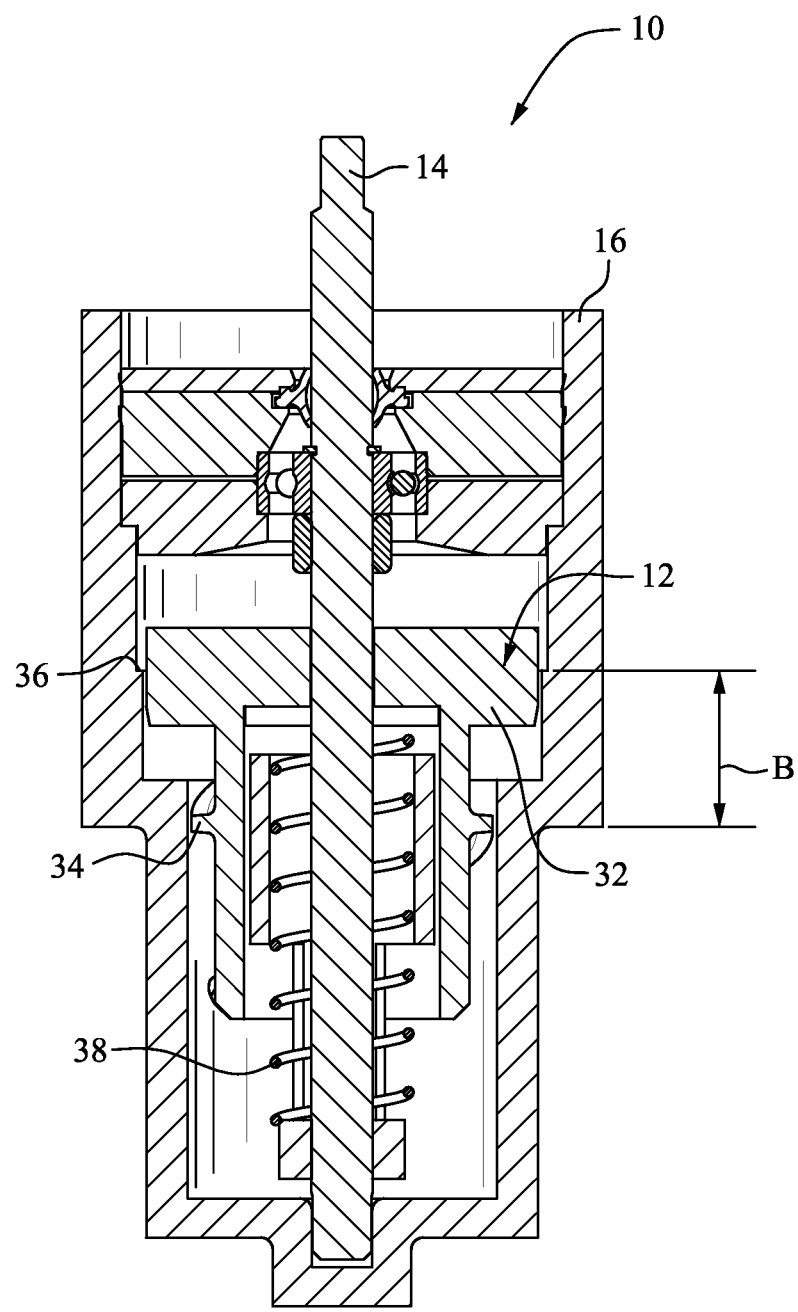
FIG. 2 shows the rotational speed control device of FIG. 1 transitioning between the low-braking stage and the high-braking stage.
Figure 3:
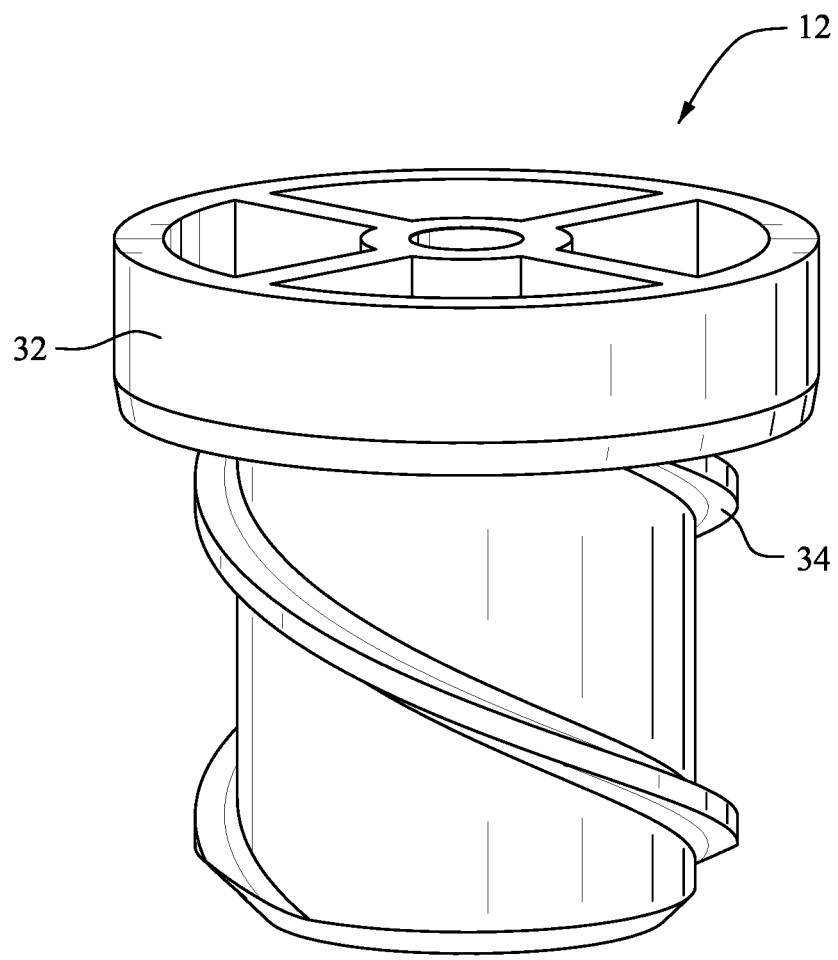
FIG. 3 shows the rotor.

FIG. 2 shows the rotor 12 displaced axially by an increase in the rotationally developed axial force. The rotor 12 is displaced such that at least a portion of the braking section 32 is disposed adjacent the small clearance section B of the inner wall of the housing 16. By virtue of the smaller clearance, a greater braking resistance is provided. FIG. 3 is an isolated view of the rotor 12.

Figure 4:
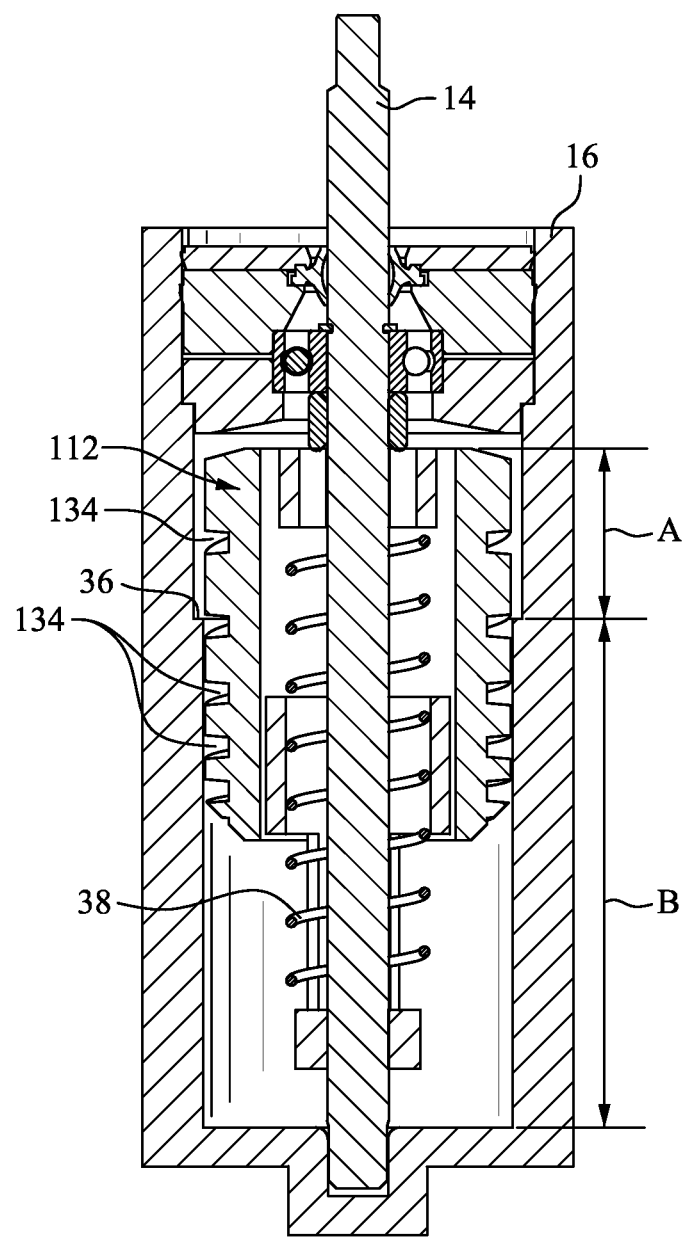
FIG. 4 shows an alternative embodiment of the rotational speed control device with a modified rotor.
Figure 5:
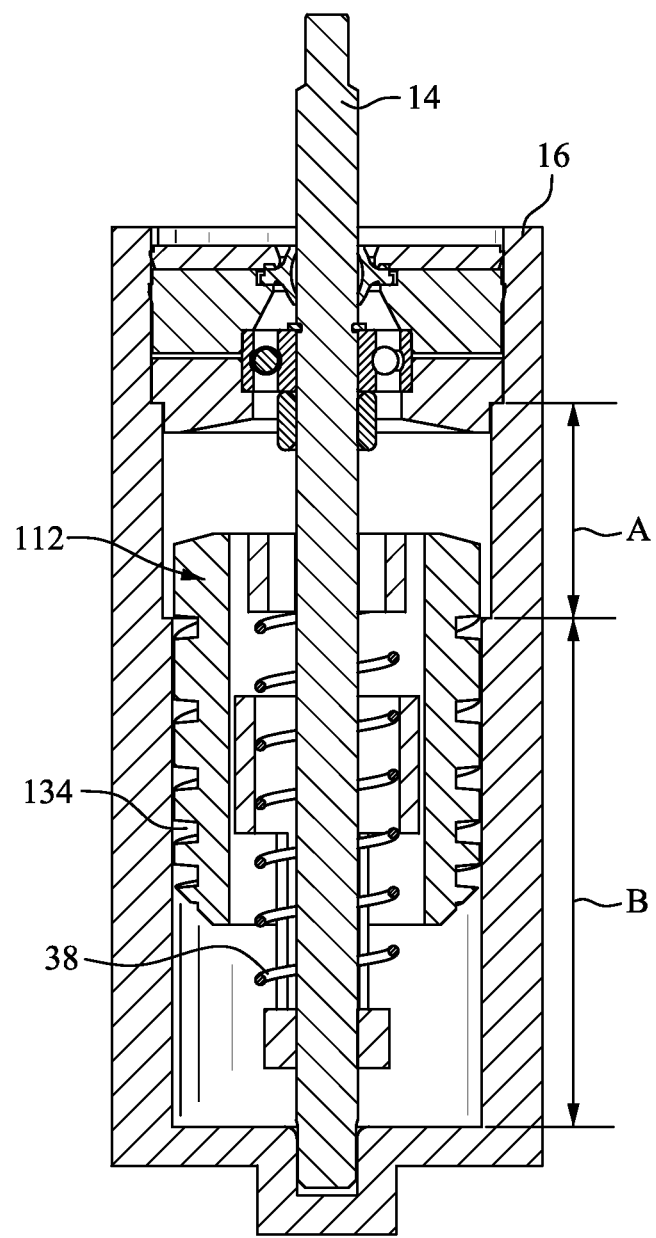
FIG. 5 shows the embodiment of FIG. 4 in an intermediate-braking position.
Figure 6:
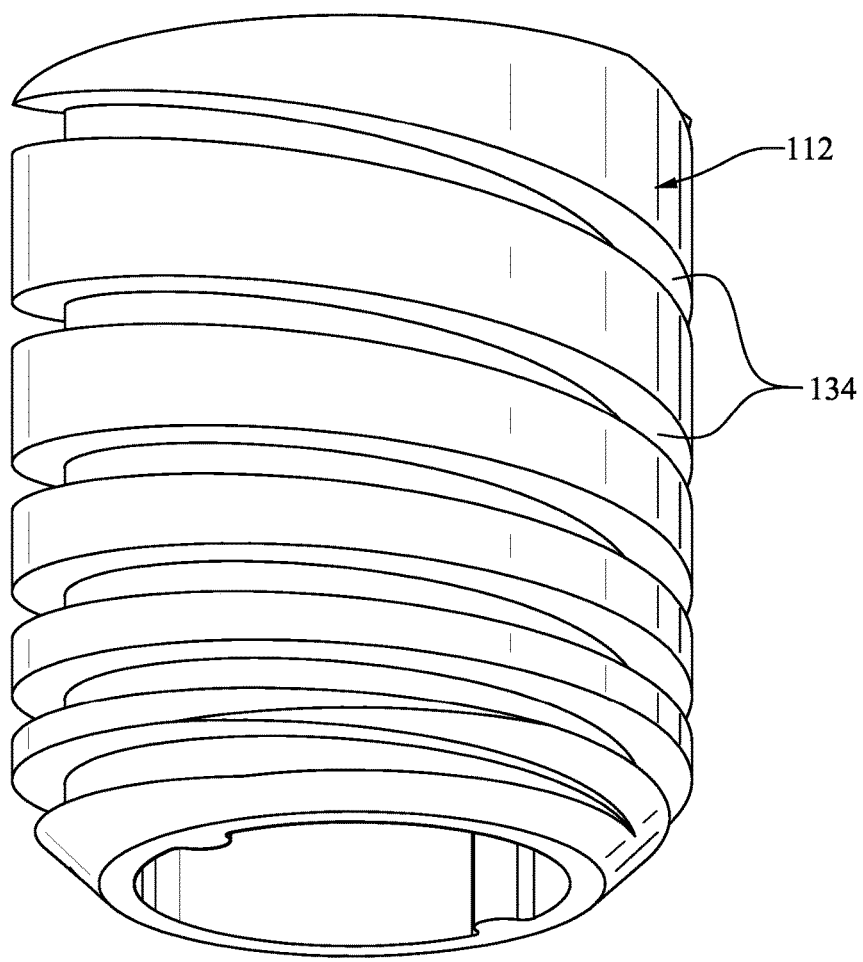
FIG. 6 shows the rotor for the embodiment of FIGS. 4 and 5.

FIGS. 4 and 5 show an alternative embodiment. In this embodiment, the rotor 112 is generally cylindrical and is provided with screw thread slots 134 that define the impeller for driving an axial position of the rotor 112. The inner wall of the housing 16 includes the step 36 such that with slower rotation, a larger portion of the rotor 112 is positioned adjacent the large clearance section A of the housing for lower braking. In the smaller clearance section B, the screw impeller/screw thread slots 134 can more effectively drive, and the smaller clearance creates relatively high-shear braking on the thread major diameter for higher braking at higher rotation speeds. With reference to FIG. 5, as the screw impeller 134 drives deeper, more of its major diameter is in the low-clearance section B, which creates more shear area and therefore, more braking. In FIGS. 4 and 5, the screw thread has a relatively short pitch with a broad thread crest. The shearing action that creates the braking is done primarily between the thread crest (major diameter) and the housing 16. FIGS. 4 and 5 show the rotor having a variable pitch screw thread with the pitch getting greater at the top. This is to create progressively wider thread crests and more area subject to the high shear that occurs in the smaller clearance section B. This style of rotor may have a variable pitch as shown or a constant pitch depending on the desired performance. FIG. 6 is an isolated view of the rotor 112.

Figure 7:
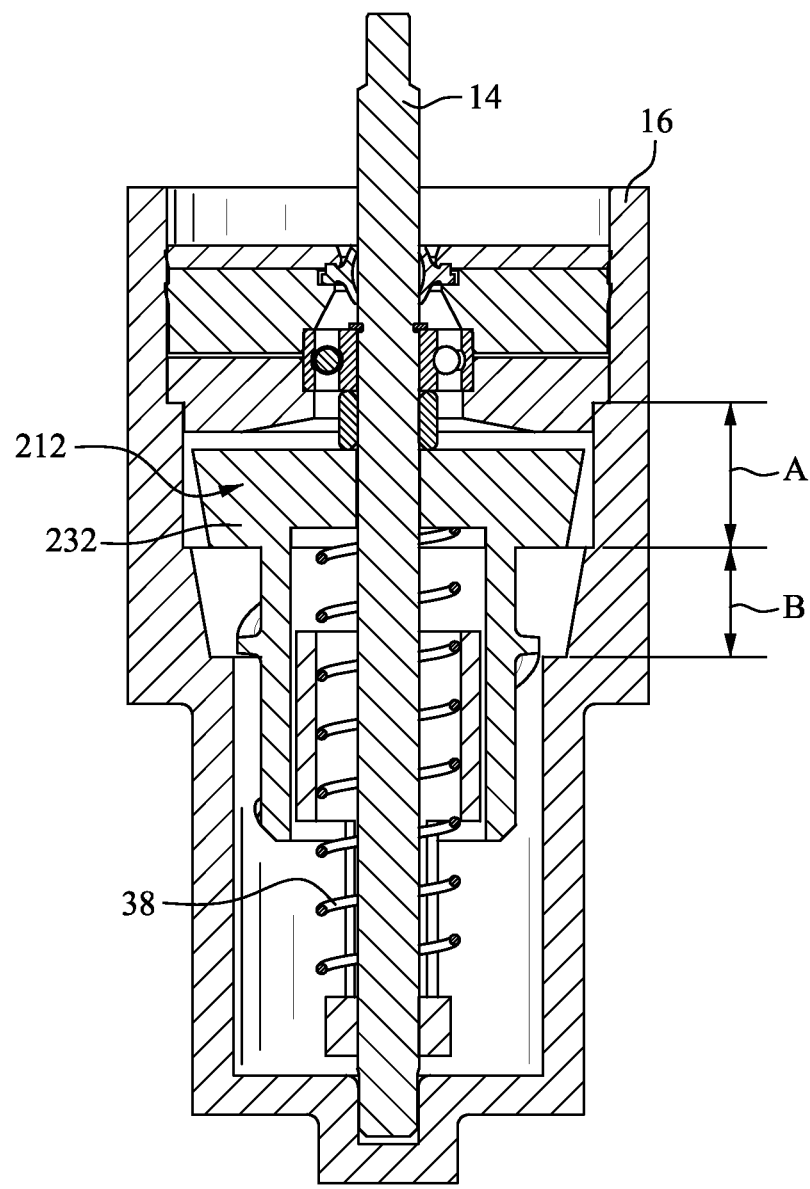
FIG. 7 is a sectional view of an alternative embodiment.
Figure 8:
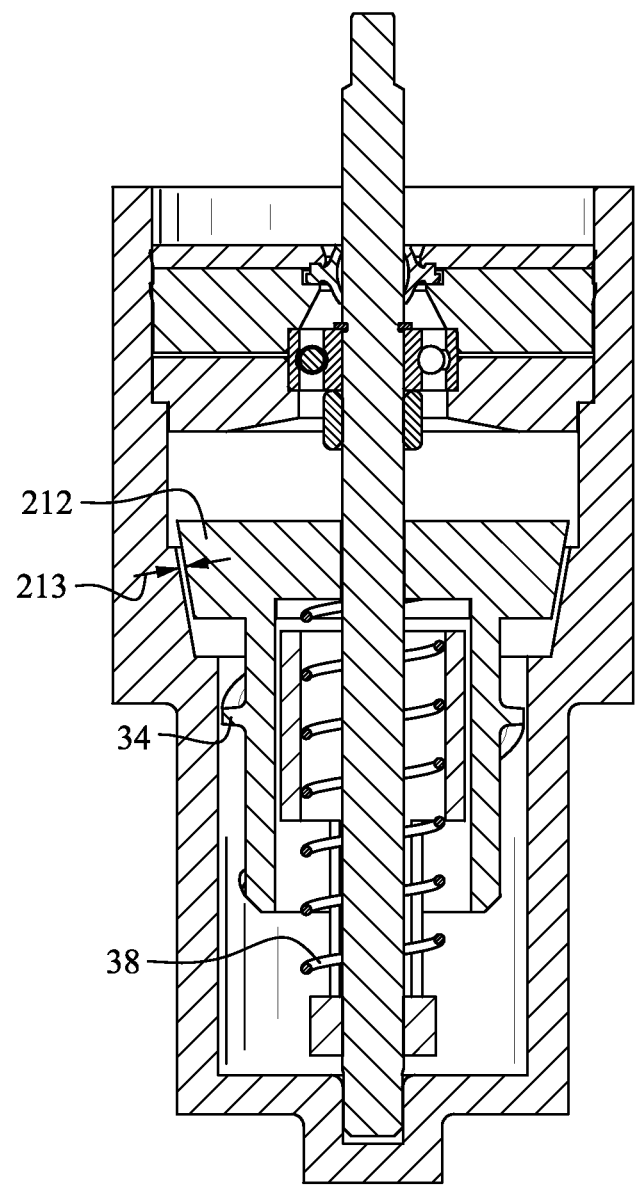
FIG. 8 is a sectional view of the FIG. 7 embodiment with the rotor transitioning from a low-braking position to a high-braking position.

FIGS. 7 and 8 show an alternative design for varying the shear and braking based on the axial position of the rotor 212. In this embodiment, the braking portion 232 of the rotor 212 is part conical-shaped, and the low-clearance section B in the housing 16 is correspondingly conical-shaped. FIG. 7 shows the rotor 212 in the low-shear/low-braking position, and FIG. 8 shows the rotor 212 at least partially in the high-shear/high-braking position. Note that the shear gap 213 gets smaller as the axial position of the rotor 212 is displaced against a force of the spring 38 by the impeller 34 due to increased rotation speeds.

Figure 9:
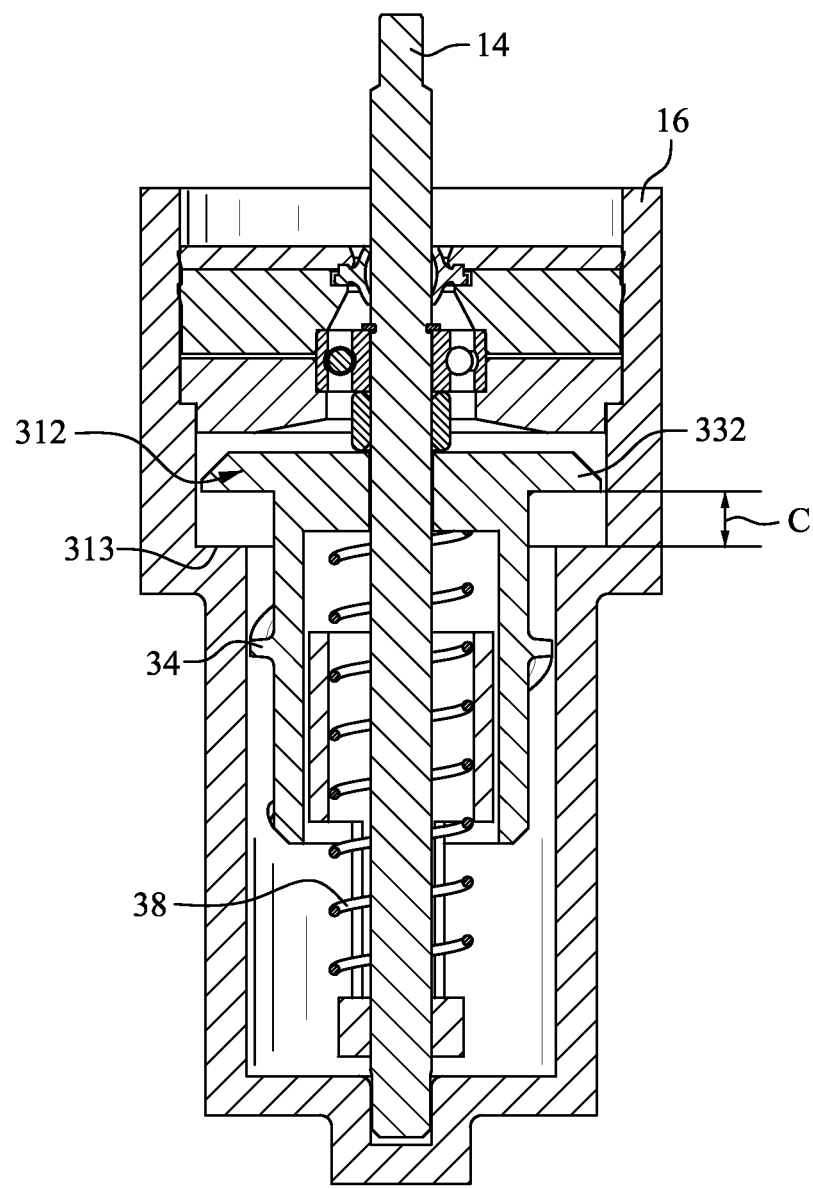
FIG. 9 is a sectional view of an alternative embodiment utilizing a disk-shaped rotor.
Figure 10:
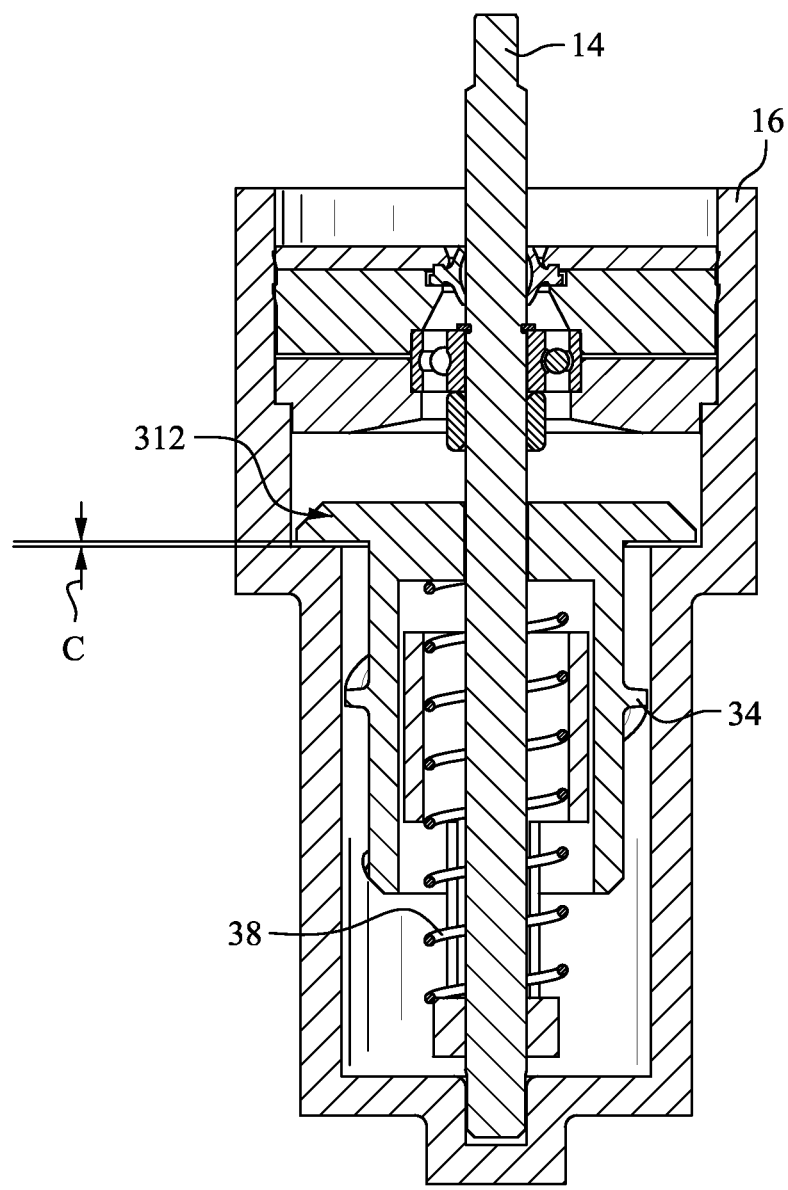
FIG. 10 is a sectional view of the embodiment in FIG. 9 in a high-braking position.

FIGS. 9 and 10 show yet another alternative embodiment where the housing includes a shoulder 313, and the braking portion 332 of the rotor 312 is spaced from the shoulder 312 by a variable shear gap C. As the axial position of the rotor 312 is driven by the impeller 34, the shear gap C is reduced as shown in FIG. 10 for higher shear and higher braking.

Figure 11:
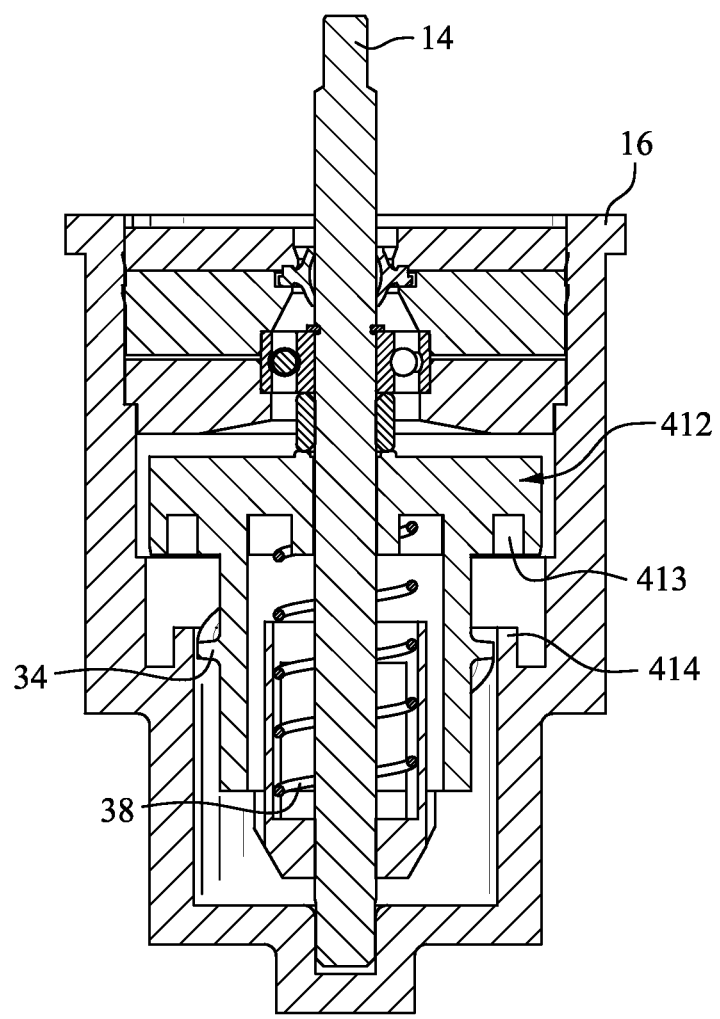
FIG. 11 is a sectional view of an alternative embodiment showing a 3-stage device with added sheer area in the minimum braking position.
Figure 12:
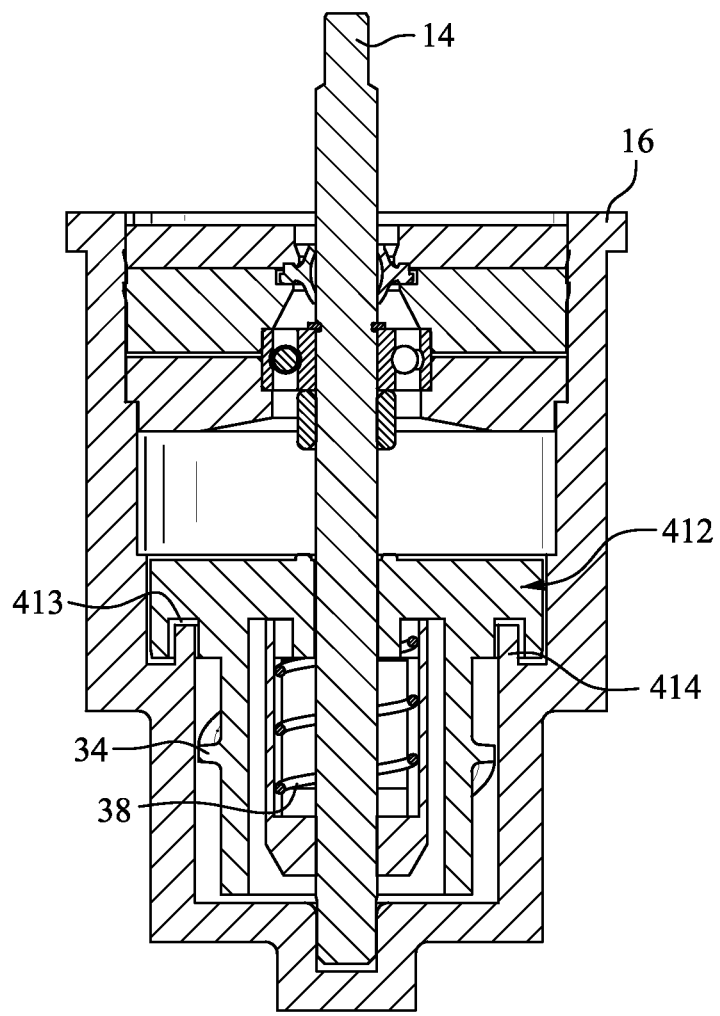
FIG. 12 is a sectional view of the FIG. 11 embodiment in a maximum braking position.
Figure 13:
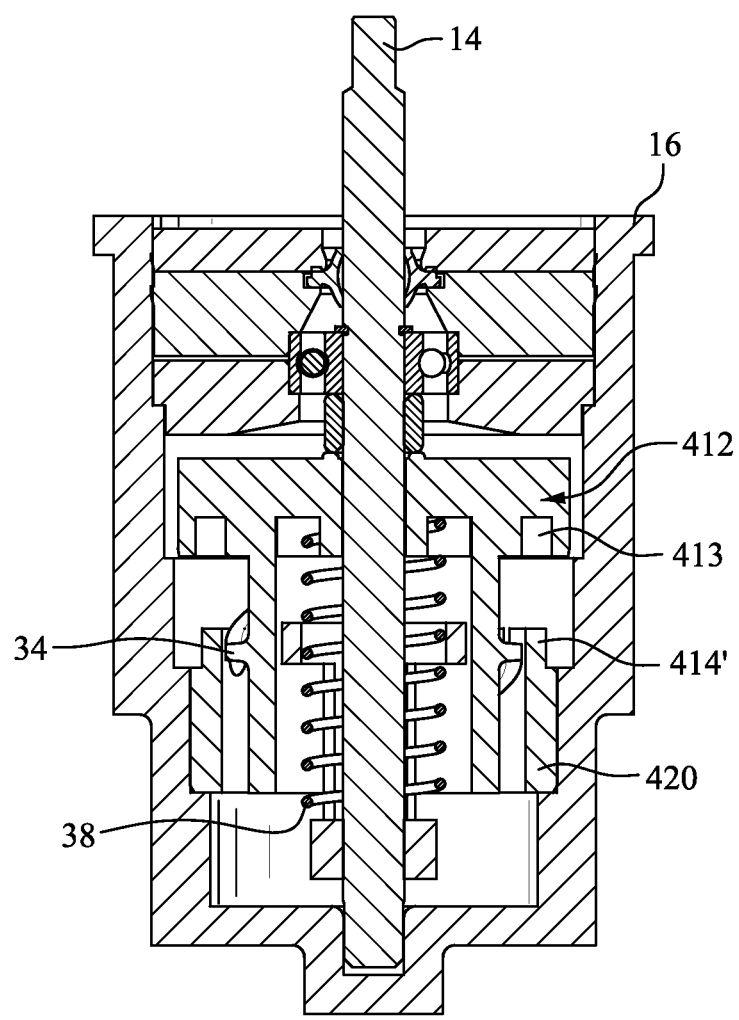
FIG. 13 is a sectional view of the FIG. 11 embodiment including a drive control band.

FIGS. 11-13 show an embodiment that not only changes the shear gap, but also adds additional shear area. The rotor 412 includes a circular slot 413 that engages a standing rib or circular ridge 414 formed in the housing 16. The ridge 414 provides added shear area when engaged by the rotor 412. In FIG. 13, the ridge 414' forms parts of a drive control band 420 inserted between the housing 16 and the rotor 412. The drive control band 420 keeps the length of the screw portion/impeller 34 of the rotor 412 that is engaged in the tight diameter constant and gives better control of the rotor response.

Figure 14:
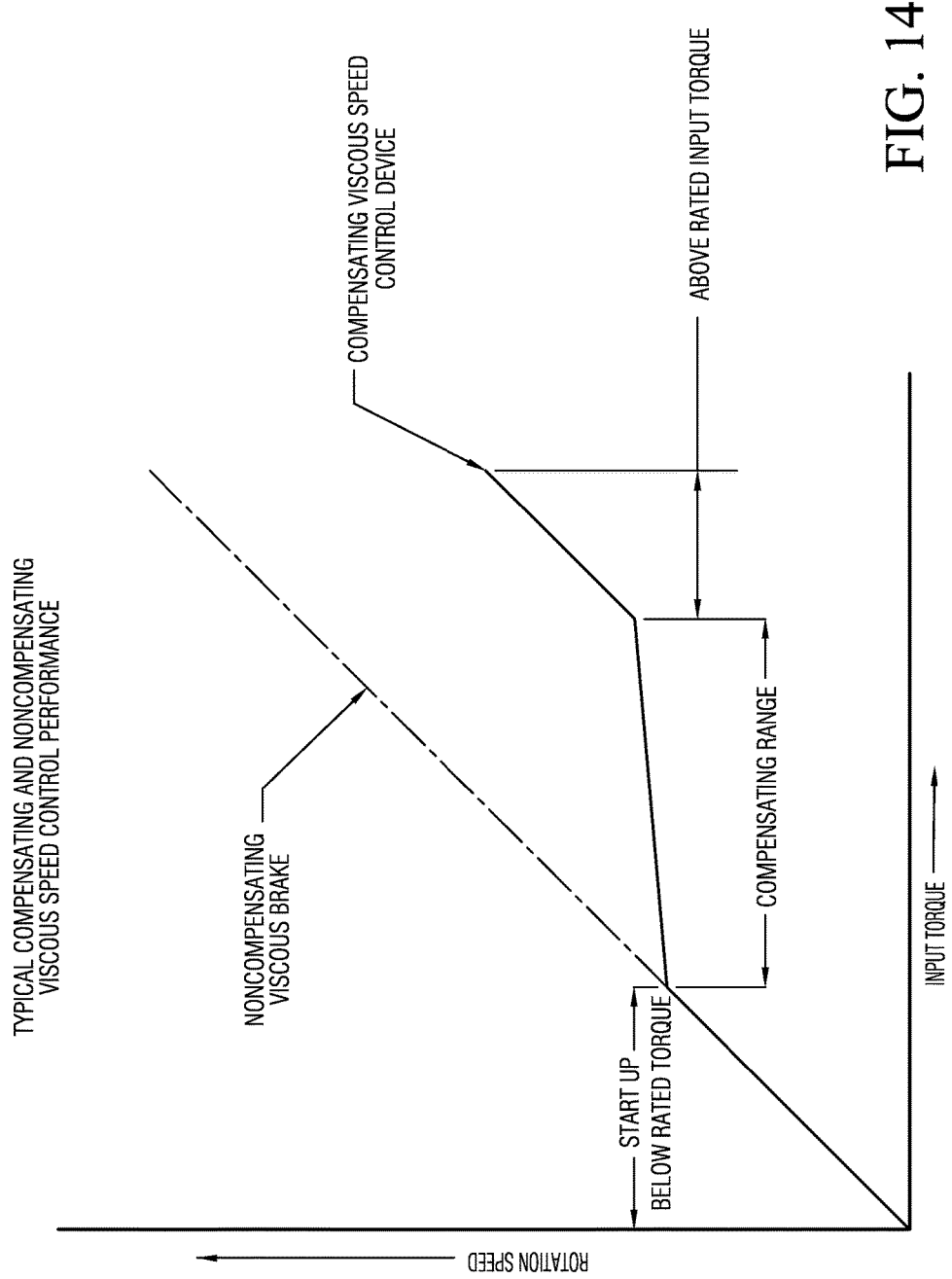
FIG. 14 is a graph showing typical compensating and noncompensating viscous speed control performance.

FIG. 14 is a typical performance graph that illustrates the performance difference between a conventional viscous brake and this device.

Figure 15:
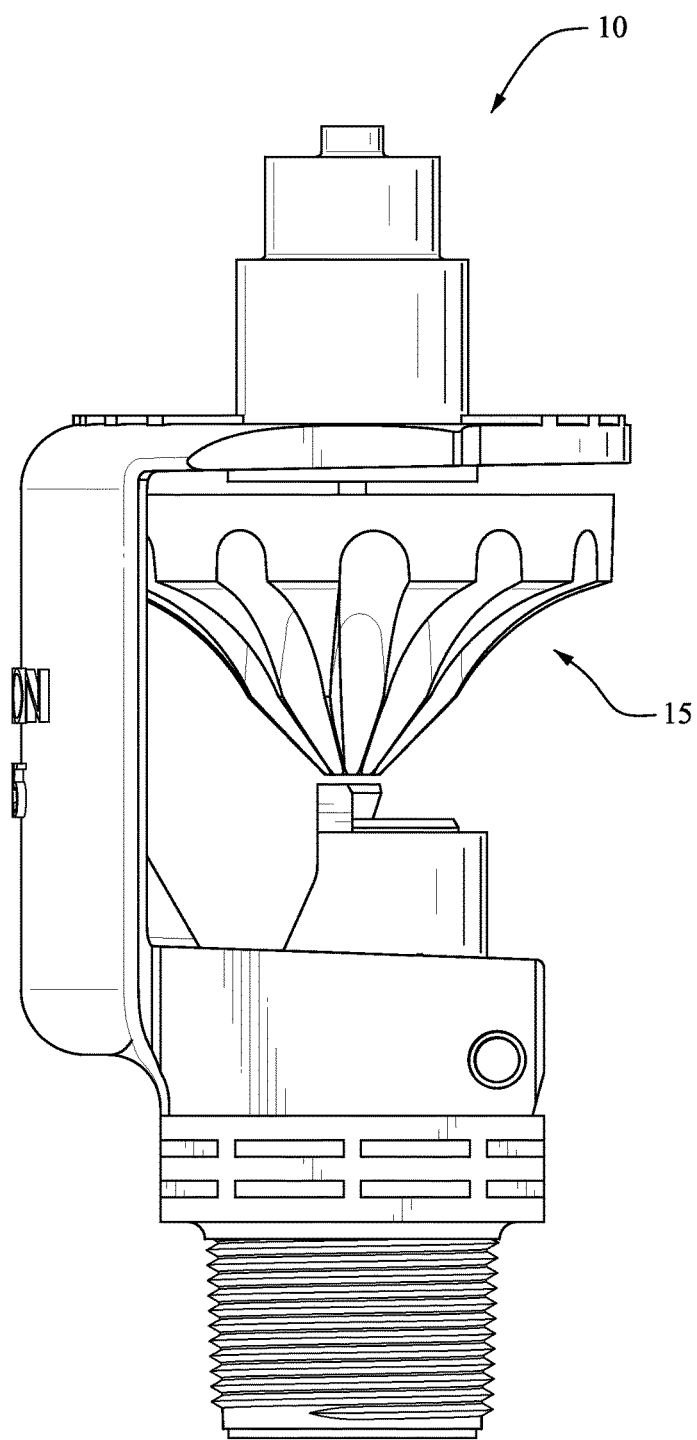
FIGS. 15 and 16 show the rotational speed control device as part of an industrial sprinkler.
Figure 16:
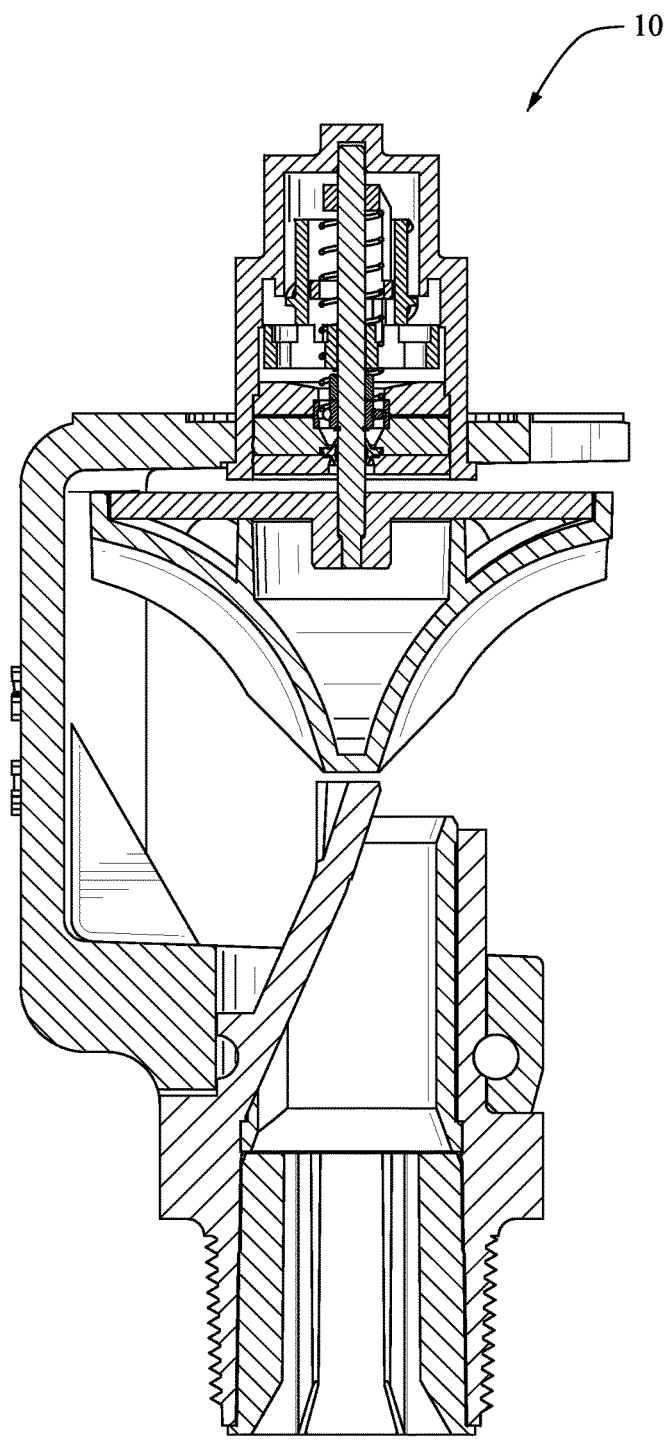

FIGS. 15 and 16 show the device 10 as part of a sprinkler. Note that the device 10 may also be employed in other forms of sprinklers including ones that would transmit torque to the device shaft via a gear train.

Figure 17:
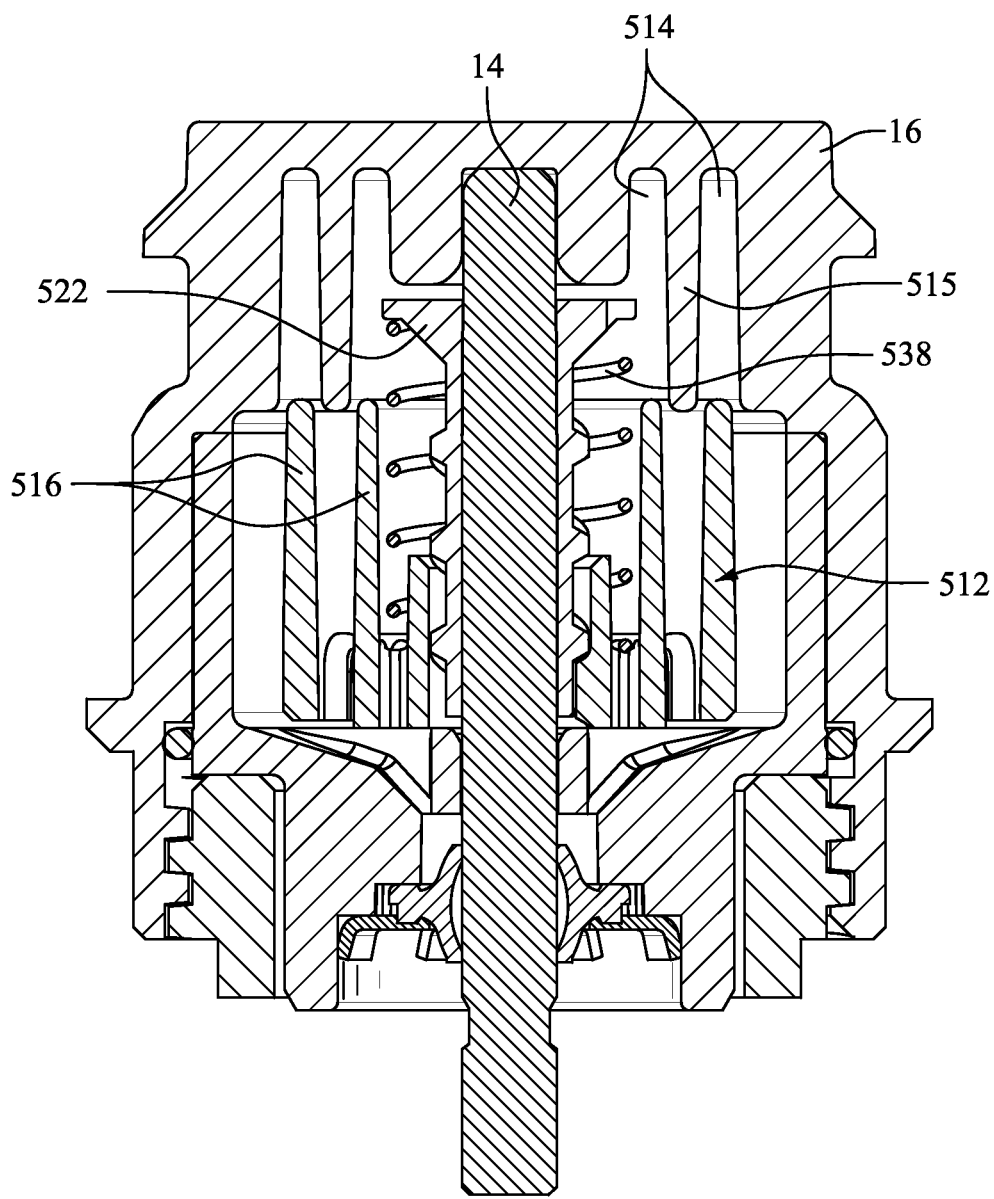
FIG. 17 is a sectional view of an alternative embodiment utilizing nested cylinders.
Figure 18:
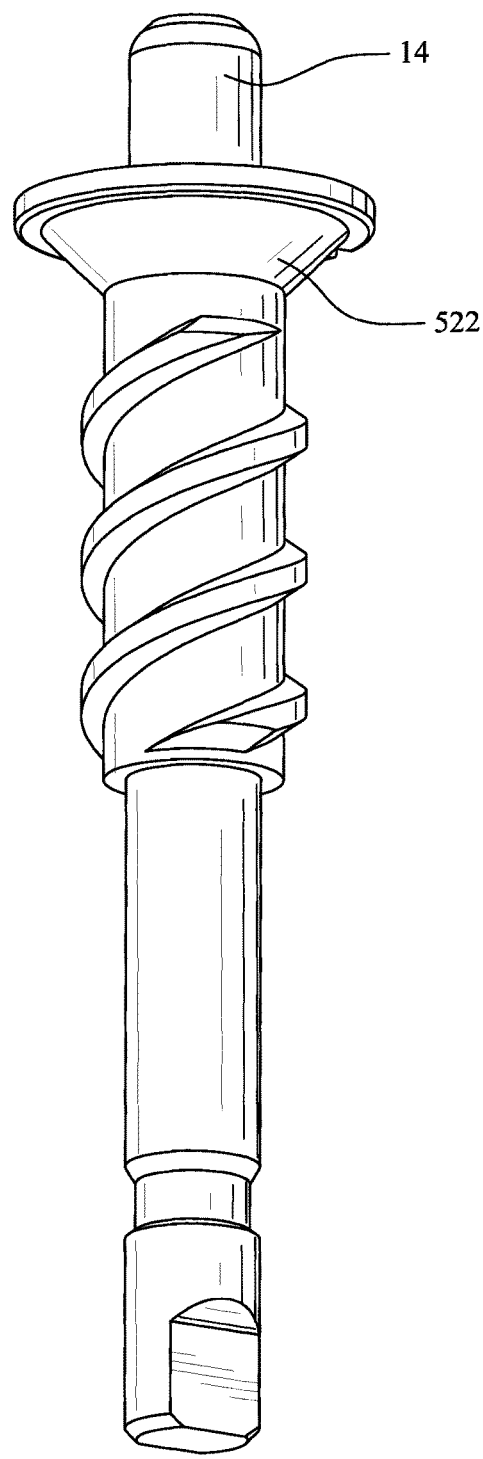
FIG. 18 shows the shaft and a threaded hub for the FIG. 17 embodiment.
Figure 19:
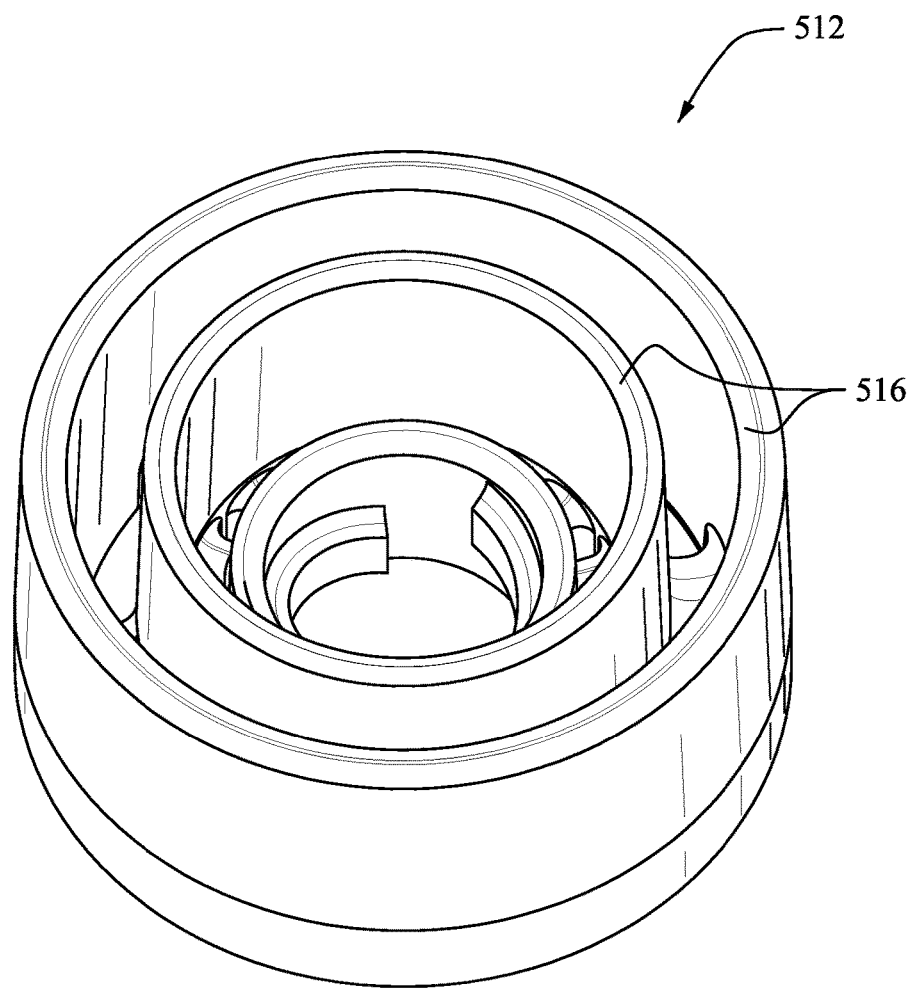
FIG. 19 is a detailed view of the rotor for the FIG. 17 embodiment.
Figure 20:
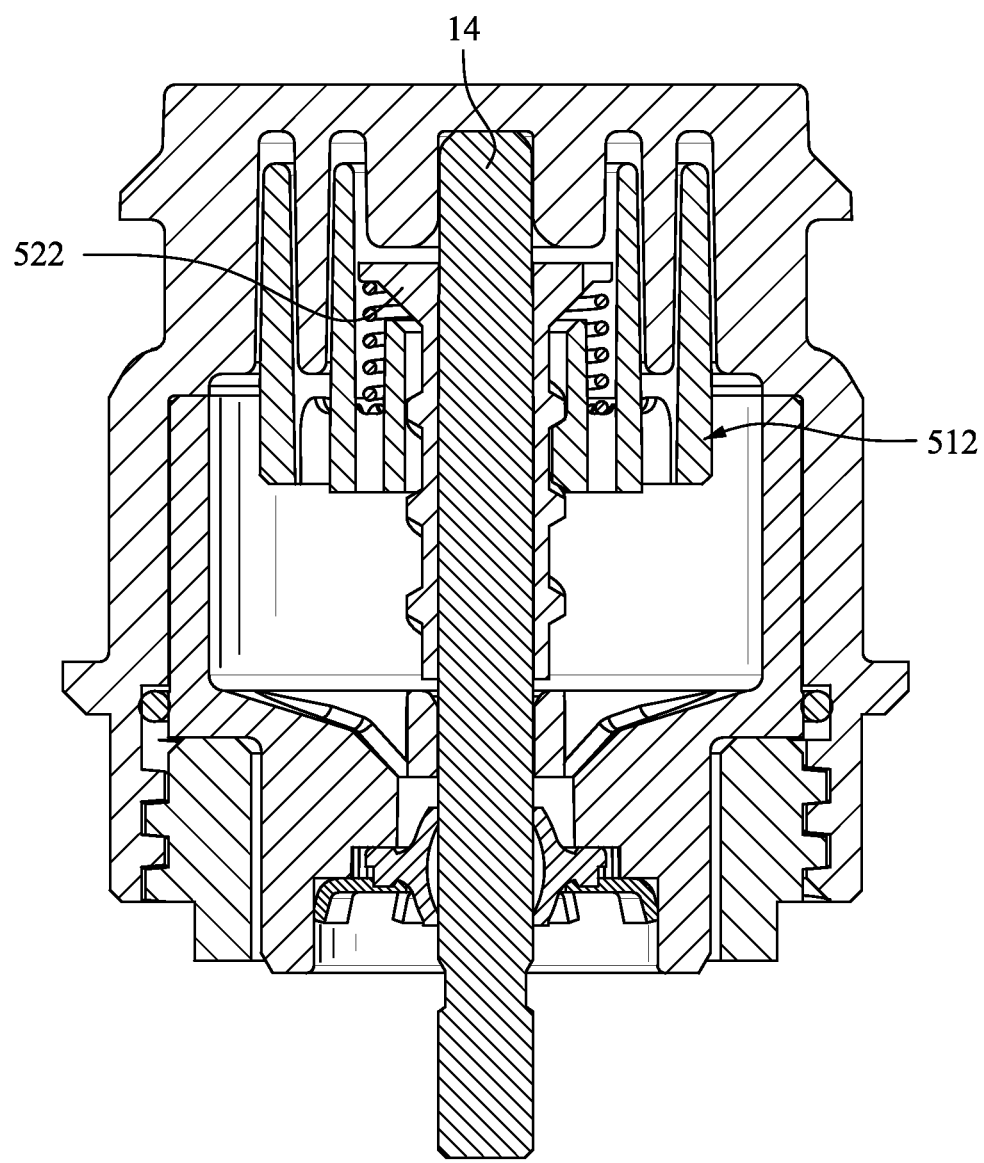
FIG. 20 shows the rotor in the FIG. 17 embodiment approaching a maximum torque position.

FIG. 17 shows another alternative configuration where the housing 16 is provided with a plurality of circular grooves 514 separated by a cylindrical ridge 515. The rotor 512 includes separated cylinders 516 that are cooperable with the grooves 514 to increase or decrease the shear and braking based on an axial position of the rotor 512. A threaded hub 522 is press fit to the shaft 14 so that it will rotate with the shaft. As it begins to rotate, the rotor 512 also rotates with the threaded hub 522, until such time that the rotation speed becomes high enough that the viscous shear overcomes the compression spring 538. FIG. 18 is an isolated view of the threaded hub 522 and the shaft 14. FIG. 19 is an isolated view of the rotor 512. FIG. 20 shows the rotor 512 displaced axially from the position shown in FIG. 17 and approaching the maximum torque position.

FIGS. 21-28 show two further embodiments for viscous fluid compensating brakes. Like prior embodiments, both units are filled with a high-viscosity silicone fluid or the like. Both designs utilize a shaft that turns components that have radially expanding members. The radially expanding members expand in response to rotation speed to increase the braking torque by decreasing the viscous fluid shear gap. In the embodiment of FIGS. 21-24, the device is shown with a smooth outside diameter on the brake shoes 614 that interacts with a smooth inside wall or inside diameter on the housing 16. The embodiment shown in FIGS. 25-28 utilizes labyrinth-type geometry in the area of interaction, but smooth or labyrinth could be used with both concepts.

Figure 21:
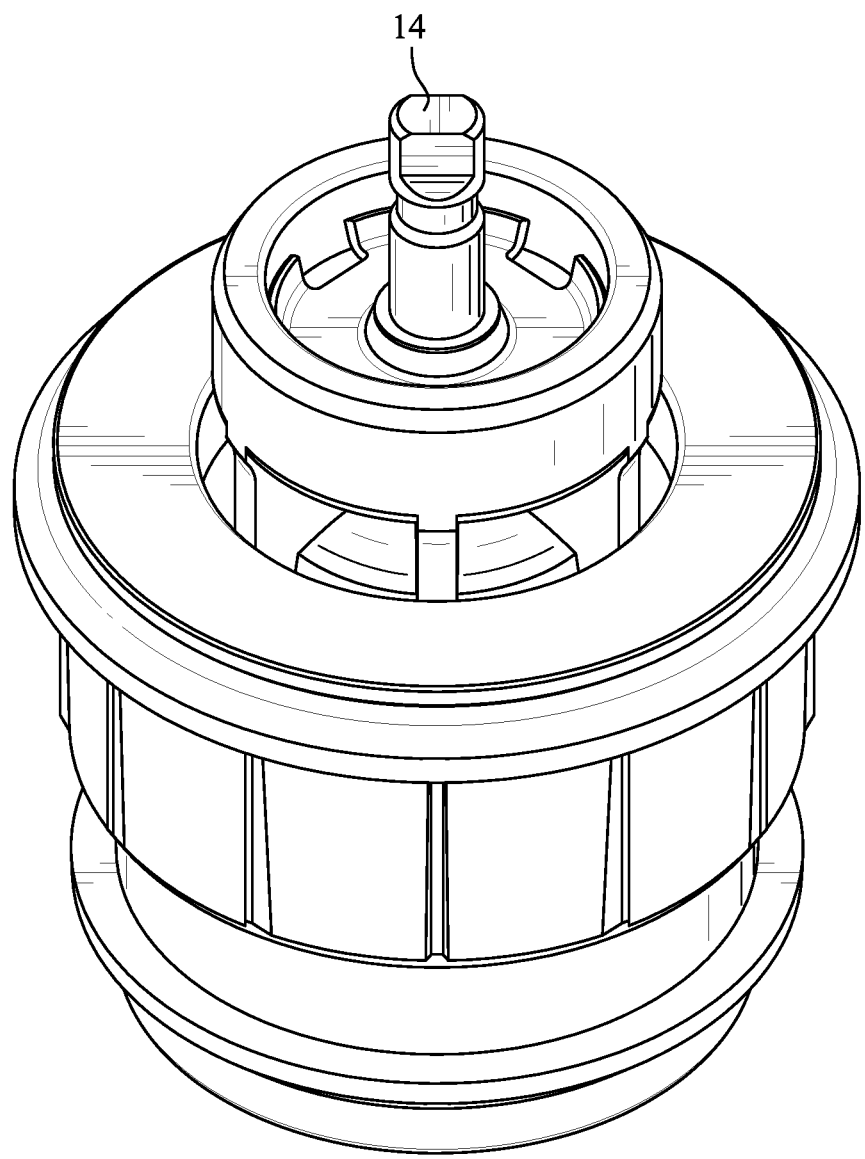
FIG. 21 is an upper perspective view of the brake assembly of an alternative embodiment.
Figure 22:
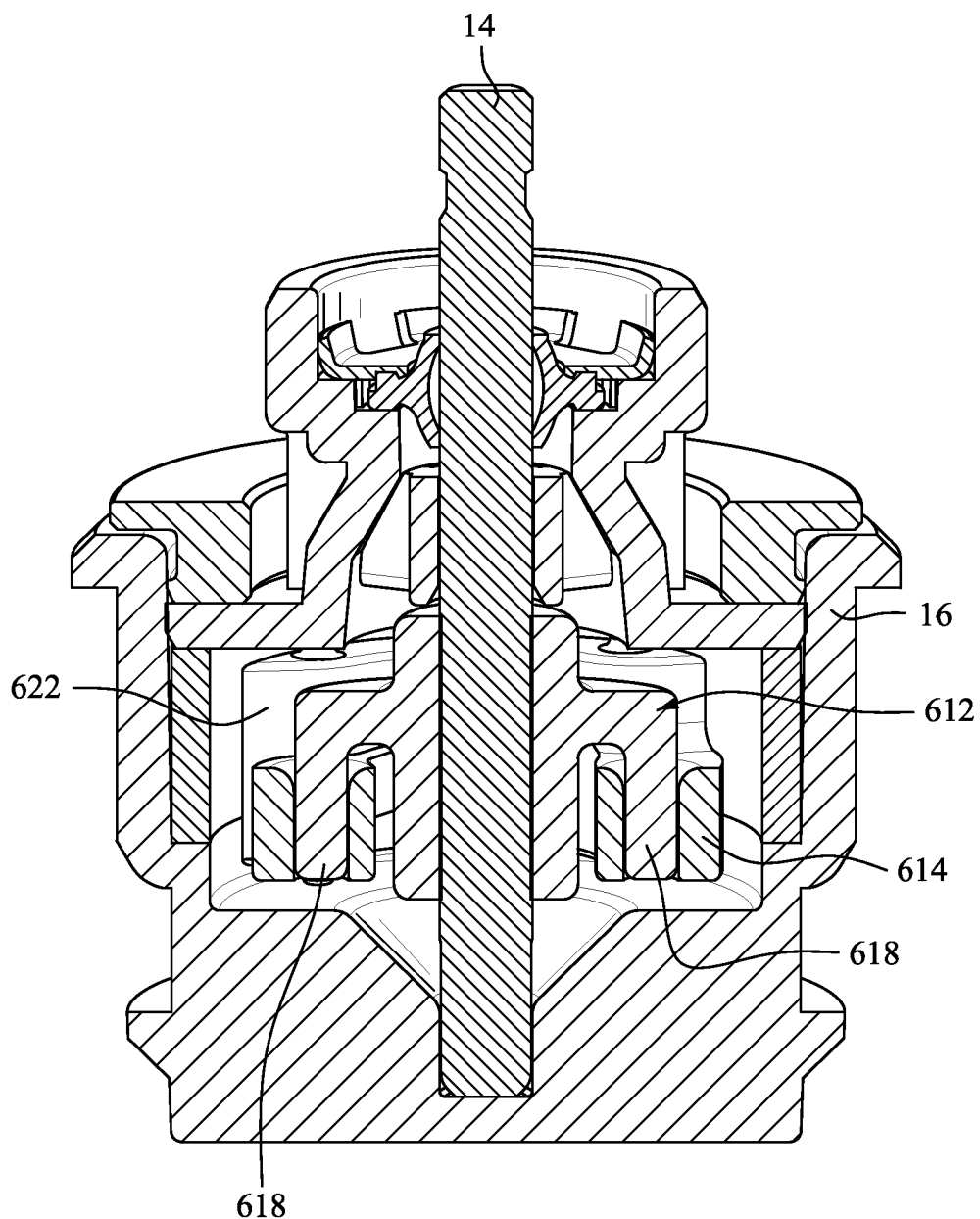
FIG. 22 is a vertical section view of FIG. 21 showing the hub and brake shoes.
Figure 23:
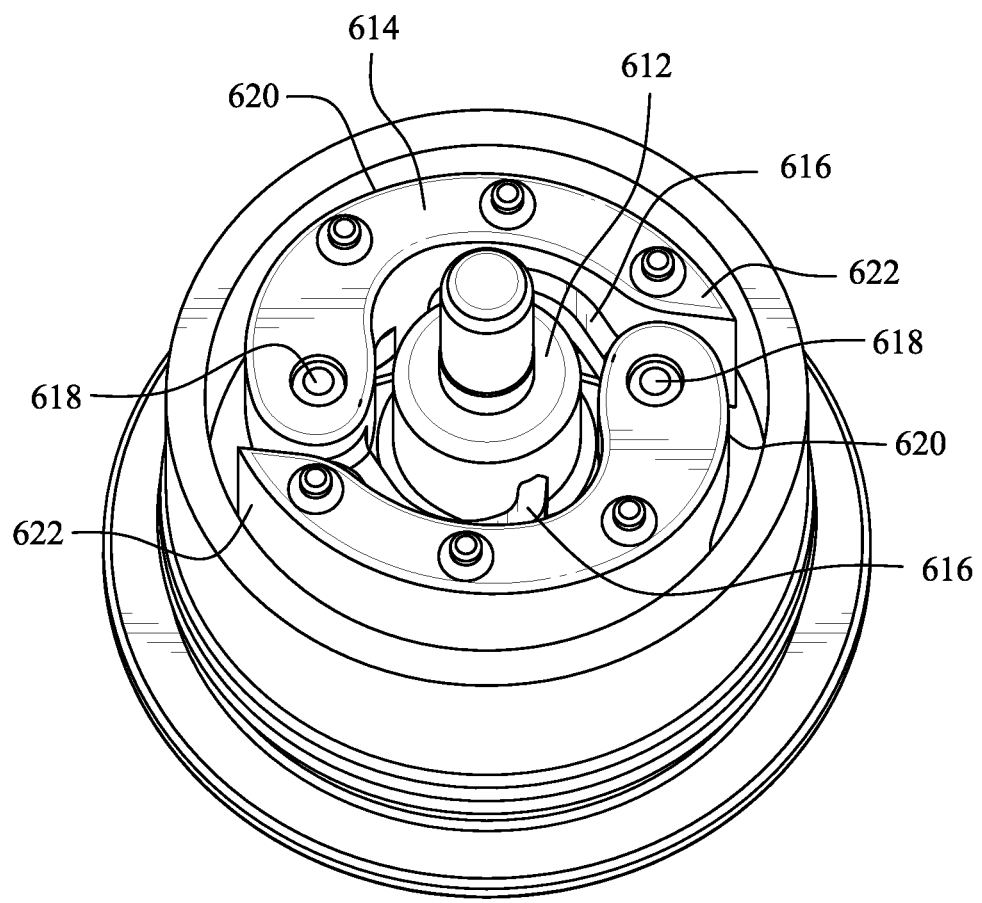
FIGS. 23 and 24 show a lower view of the FIG. 21 assembly with the housing removed.
Figure 24:
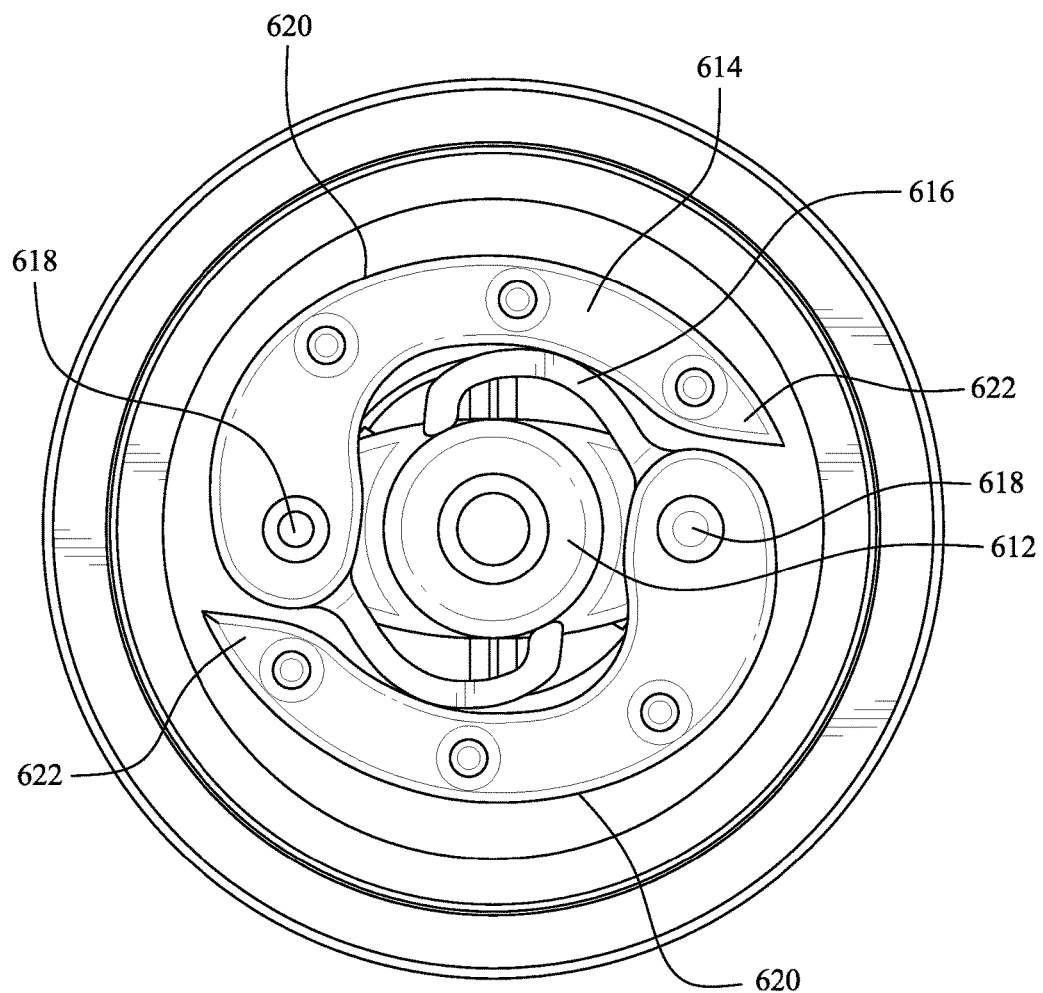

FIG. 21 is an upper perspective view of the brake assembly alone. FIG. 22 is a vertical section view of FIG. 21 showing the hub 612 and brake shoes 614. FIGS. 23 and 24 show a lower view of the assembly with the housing removed. The brake shoes 614 are in the minimum torque position, being biased there by integral springs 616. The hub 612 is secured to the shaft 14 for rotation with the shaft 14. The hub 612 includes pivot posts 618 about which the brake shoes 614 are pivotable, respectively. The brake shoes 614 include exterior surfaces 620 that are curved substantially corresponding to the inside wall of the housing 16. As the brake shoes 614 pivot on the pivot posts 618, the curved exterior surfaces 620 of the brake shoes 614 are displaced radially outward toward the inside wall of the housing 16. An amount of pivot/displacement of the brake shoes 614 varies according to a rotation speed of the shaft 14.

The minimum torque position shown is the position of the shoes 614 when the unit is at rest or when turning very slowly. The leading edges 622 of the shoes are shaped such that as rotation speed increases, the shoes 614 will pivot outward against the force of the spring 616 to decrease the fluid shear gap on the outside of the shoes 614, thereby increasing the braking torque. That is, the brake shoes 614 are pivoted radially outward by rotation of the shaft 14 by an amount that varies according to the rotation speed of the shaft 14. In one arrangement, the leading edges 622 of the brake shoes 614 are tapered, although other shapes may be suitable. The shoes 614 may be configured to press against the inside wall of the housing 16 to add a mechanical friction component to the braking torque.

Figure 25:
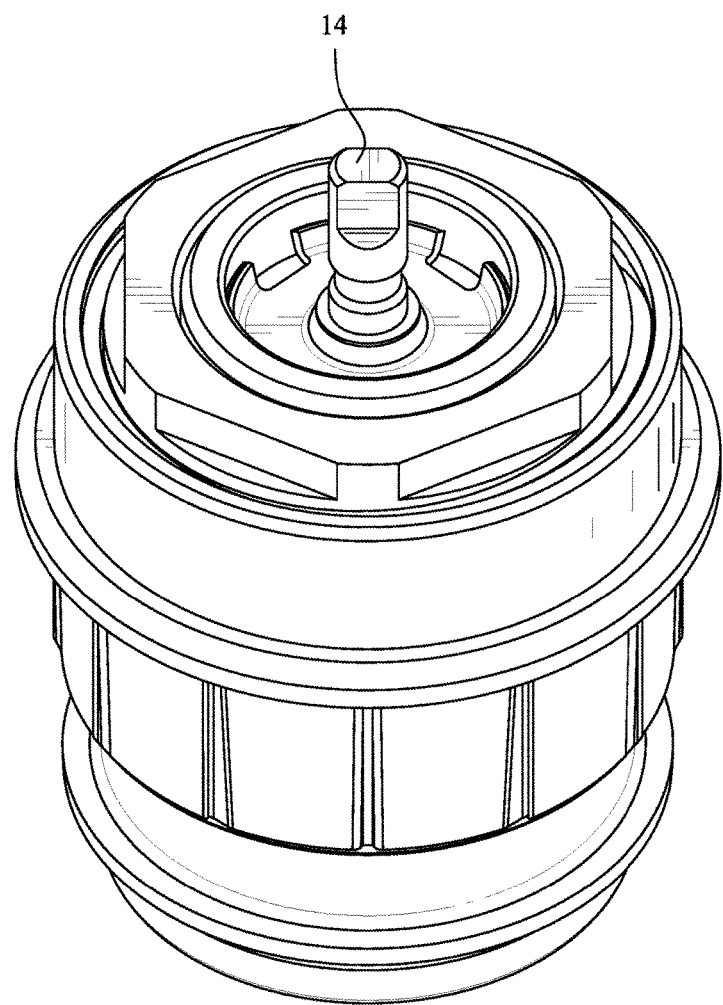
FIG. 25 is an upper perspective view of an alternative brake assembly.
Figure 26:
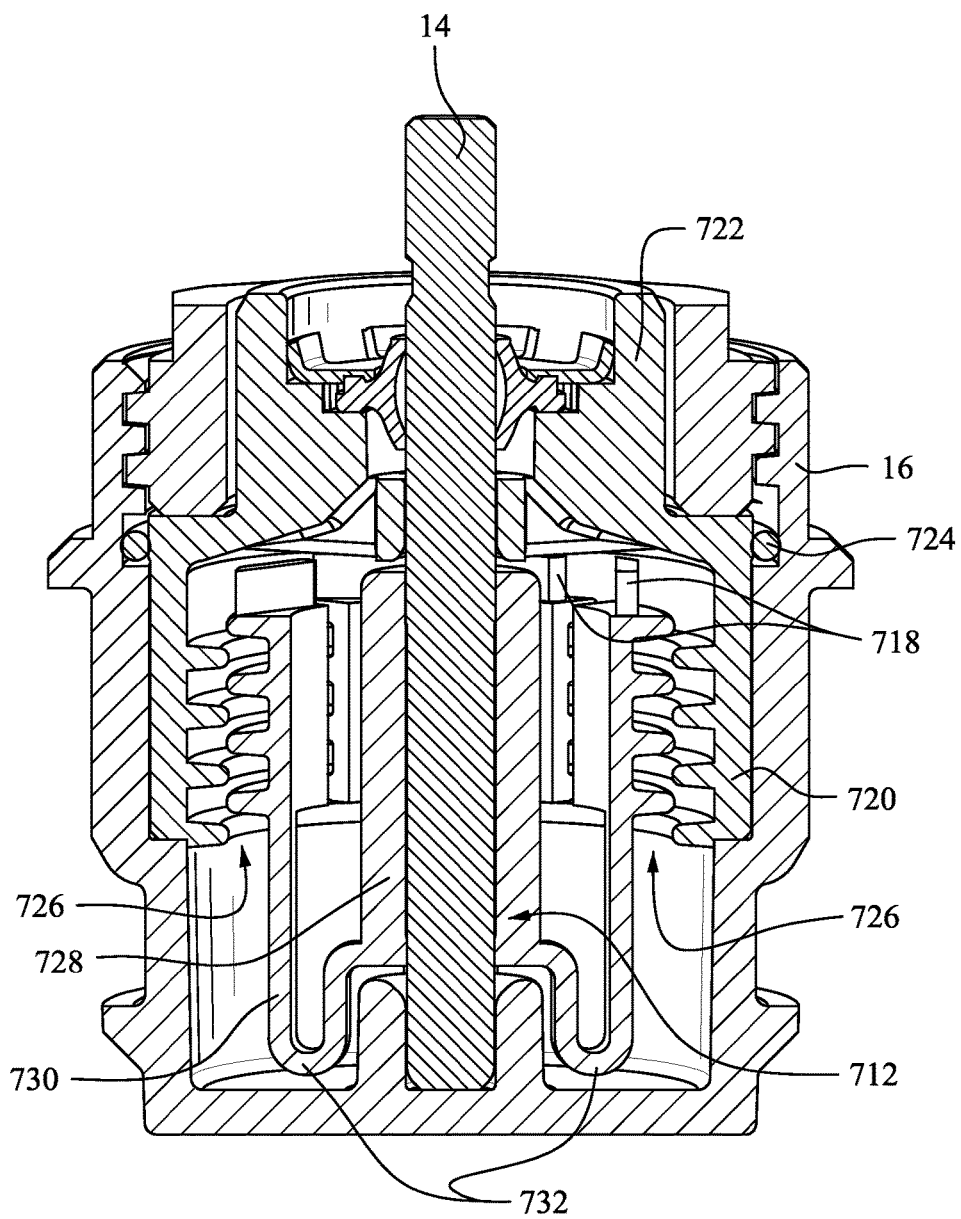
FIGS. 26 and 27 are sectional views of the FIG. 25 embodiment.
Figure 27:
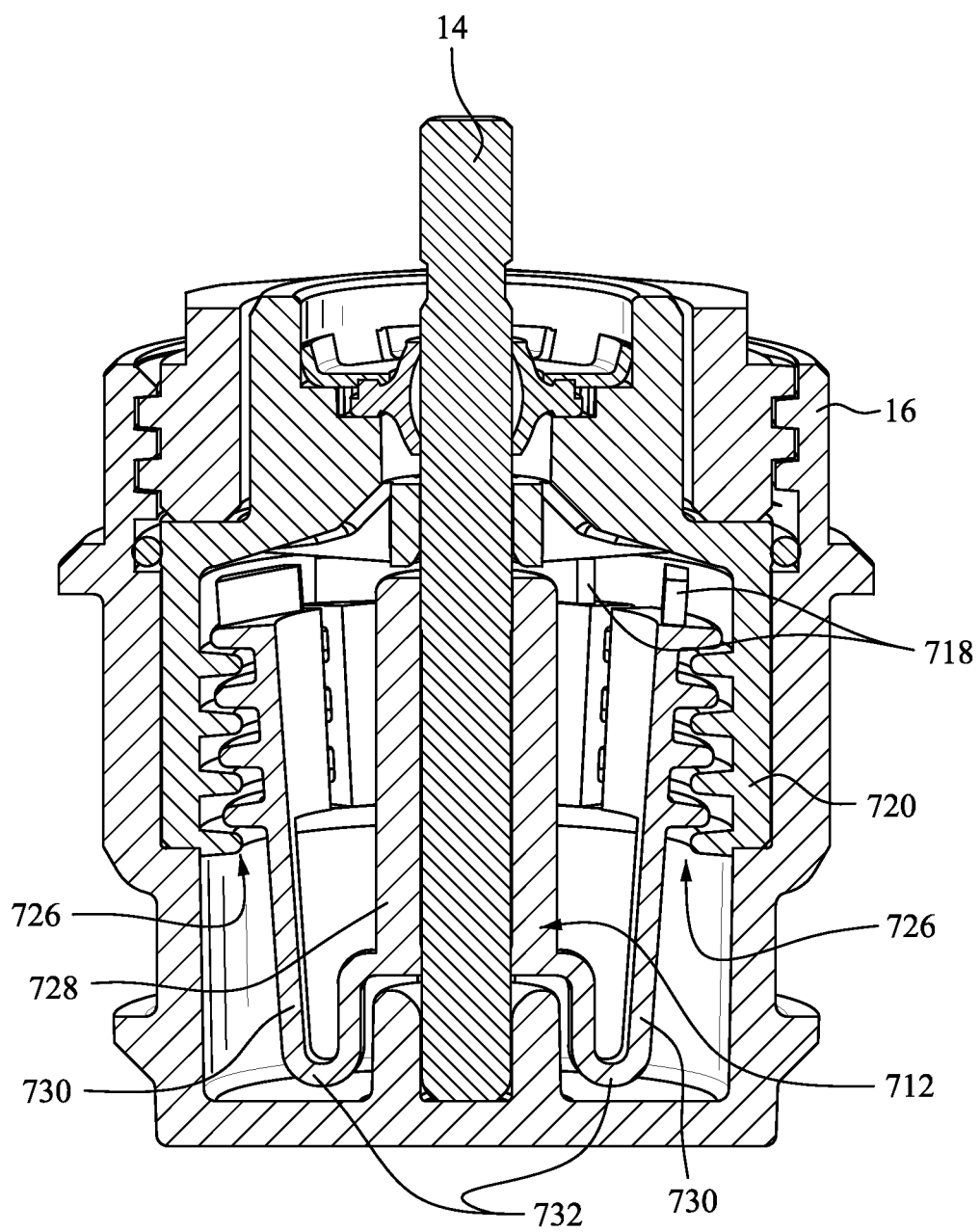

FIG. 25 is an upper perspective view of an alternative brake assembly alone. FIGS. 26 and 27 are vertical section views. The housing 16 may be provided with labyrinth rings 720 on the inside wall. The rings 720 may be machined or molded with the housing 16, or the rings 720 may be in the form of an insert 722 secured in the housing 16. As shown in FIG. 26, a seal 724 such as an O-ring or the like seals a joint between the housing 16 and the insert 722.

In this embodiment, the radially expanding member may include labyrinth segments 726 that are displaceable between a contracted position (FIG. 26) and an expanded position (FIG. 27). The segments 726 are sized and positioned to interact with the labyrinth rings 720 in the expanded position. The radially expanding member also includes a rotor section 728 that is fixed to the shaft 14 and segment arms 730 coupled with the rotor section 728. As shown, the labyrinth segments 726 are disposed on outside surfaces of the segment arms 730. A spring section 732 acts between the rotor section 728 and segment arms 730 and biases the segment arms 730 toward the contracted position. In one arrangement, the rotor section, the spring section and the segment arms may be integral with one another.

In FIG. 26, the rotor 712 is in the minimum torque position (at rest or at low speed), and in FIG. 27, the rotor 712 is nearing the maximum torque position. The rotor 712 includes a plurality of angled propeller blades 718 at the top of the rotor 712 coupled with each of the segment arms 730. As speed increases from the configuration in FIG. 26, the propeller blades 718 force the rotor segments outwardly, and the labyrinth segments 726 on the rotor 712 are interacting with the labyrinth rings 720 in the housing 16 to decrease the fluid shear gap and thereby increase the braking torque. That is, the propeller blades 718 are shaped and positioned to deflect the segment arms 730 against a force of the spring section 732 toward the expanded position by rotation of the shaft 14 by an amount that varies according to a rotation speed of the shaft 14.

Figure 28:
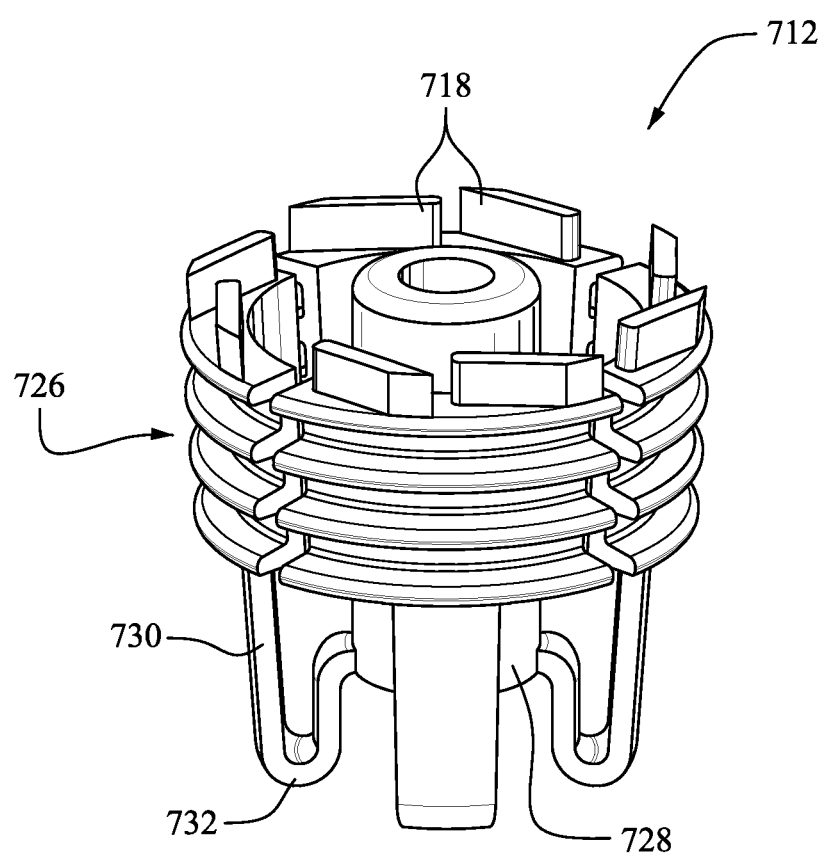
FIG. 28 is a perspective view of the rotor in the FIG. 25 embodiment.

FIG. 28 is an upper perspective view of the rotor 712 alone. The rotor 712 as shown is a single piece that may be molded out of a resilient plastic. The rotor could also be constructed as a multi-piece assembly if desired.

FIGS. 29-36 show yet another alternative configuration of the brake assembly. In principle, it is similar to the other described embodiments. Axial motion, however, is powered with propeller-type blades rather than a screw thread, and multiple concentric rings rotate in close proximity to multiple stationary rings to create the viscous-braking action.

Figure 29:
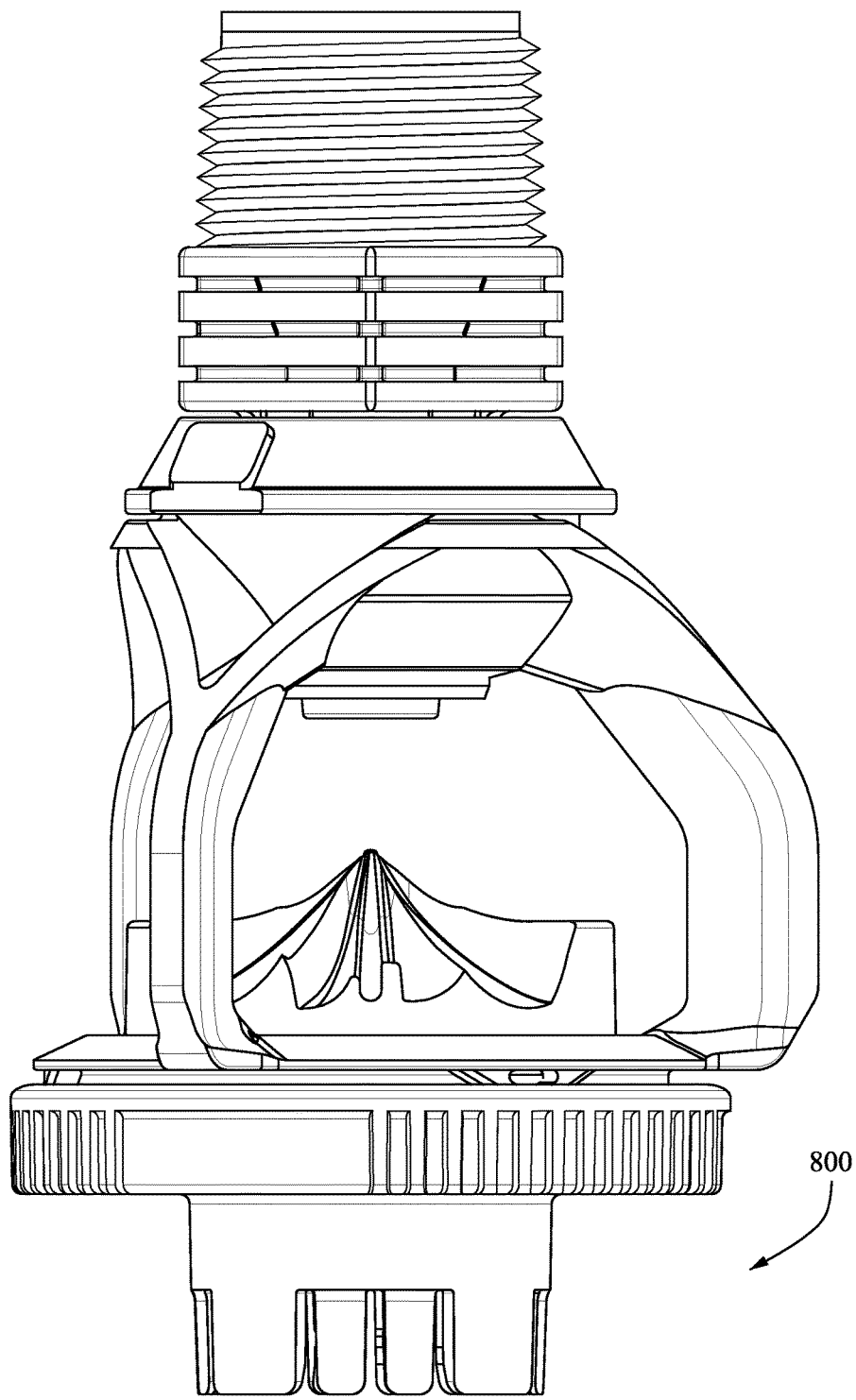
FIG. 29 is a side view of an alternative embodiment installed in an exemplary rotator sprinkler.
Figure 30:
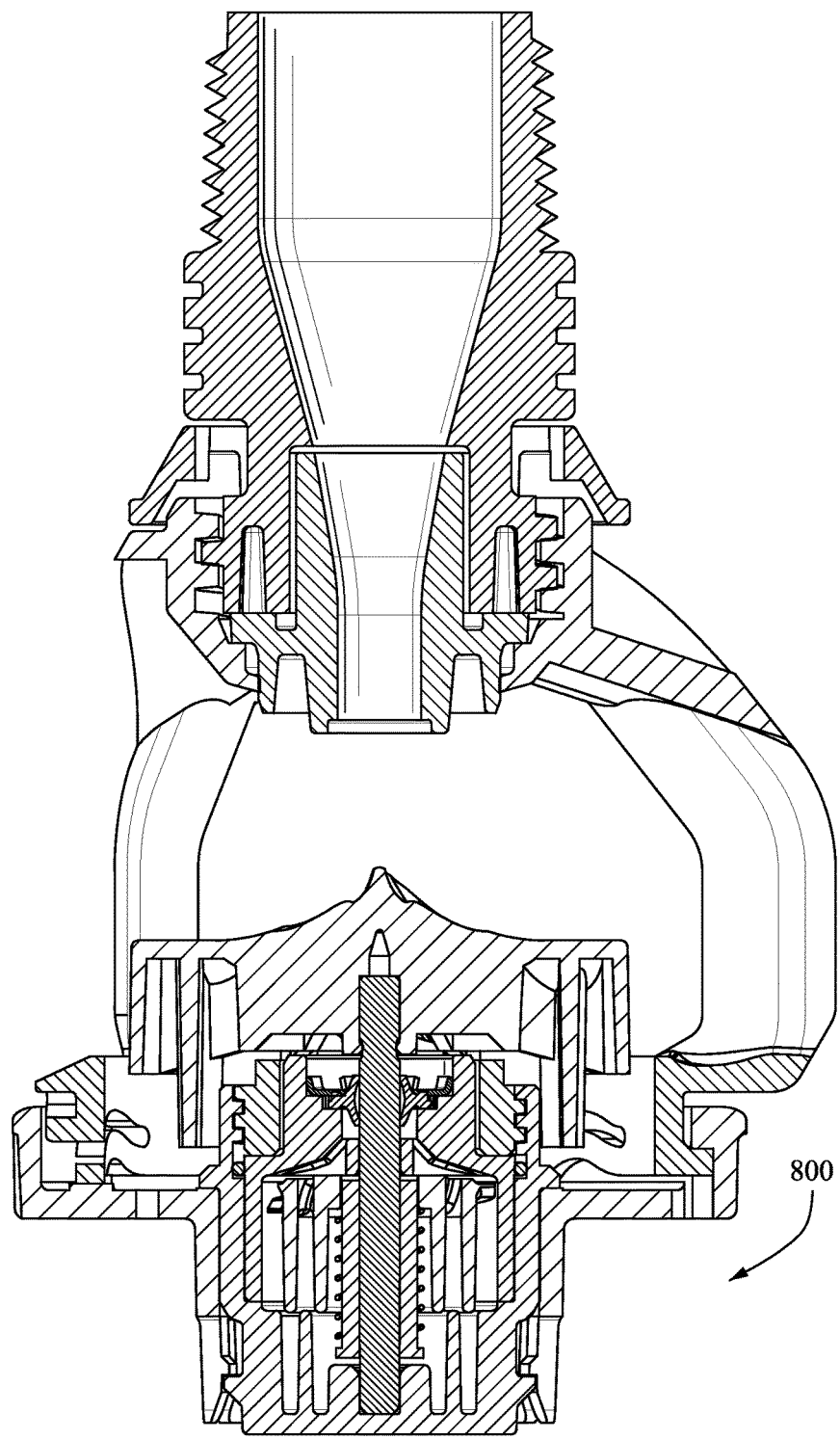
FIG. 30 is a sectional view of FIG. 29.
Figure 31:
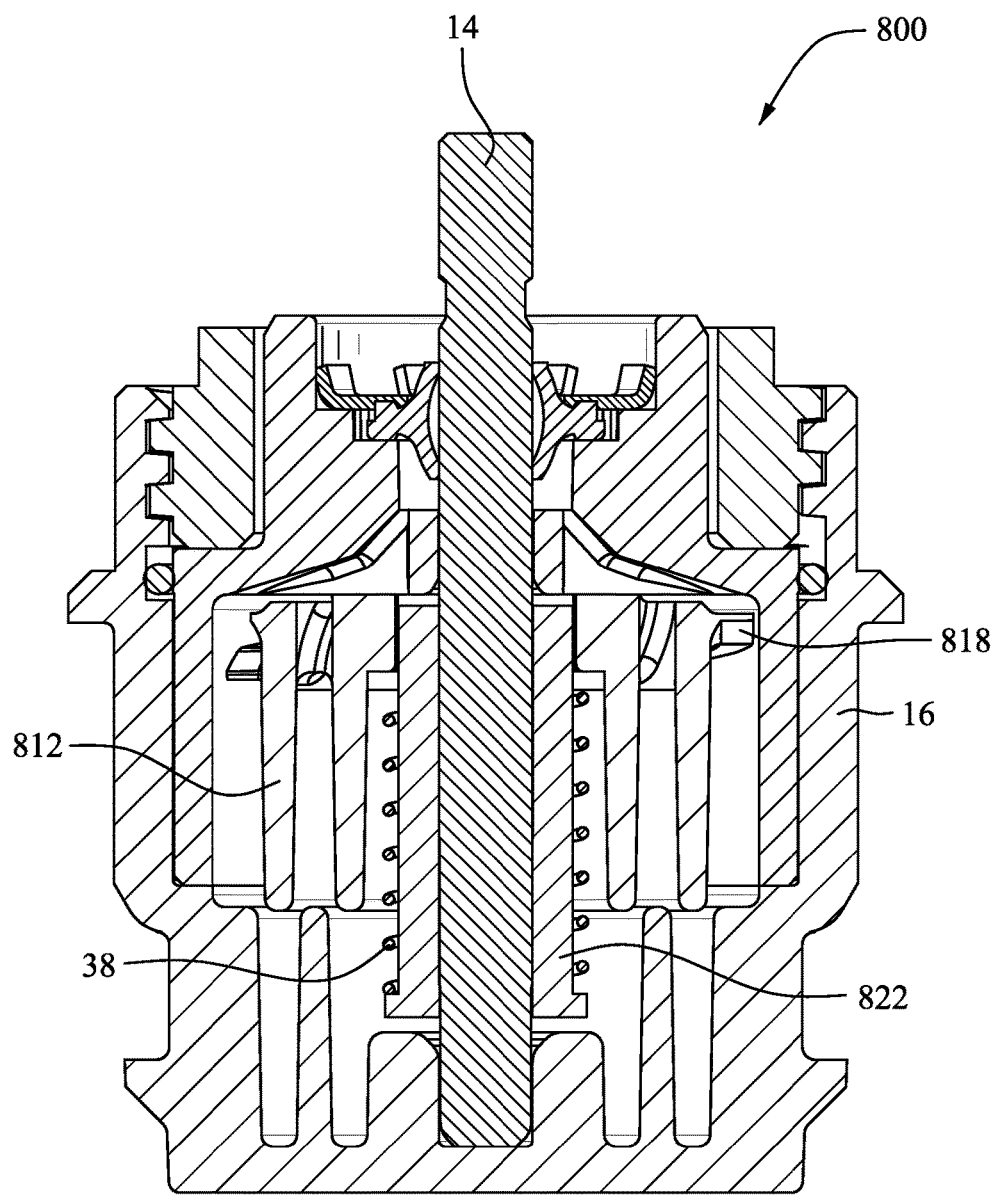
FIG. 31 is a sectional view of the brake assembly in the FIG. 29 embodiment.
Figure 32:
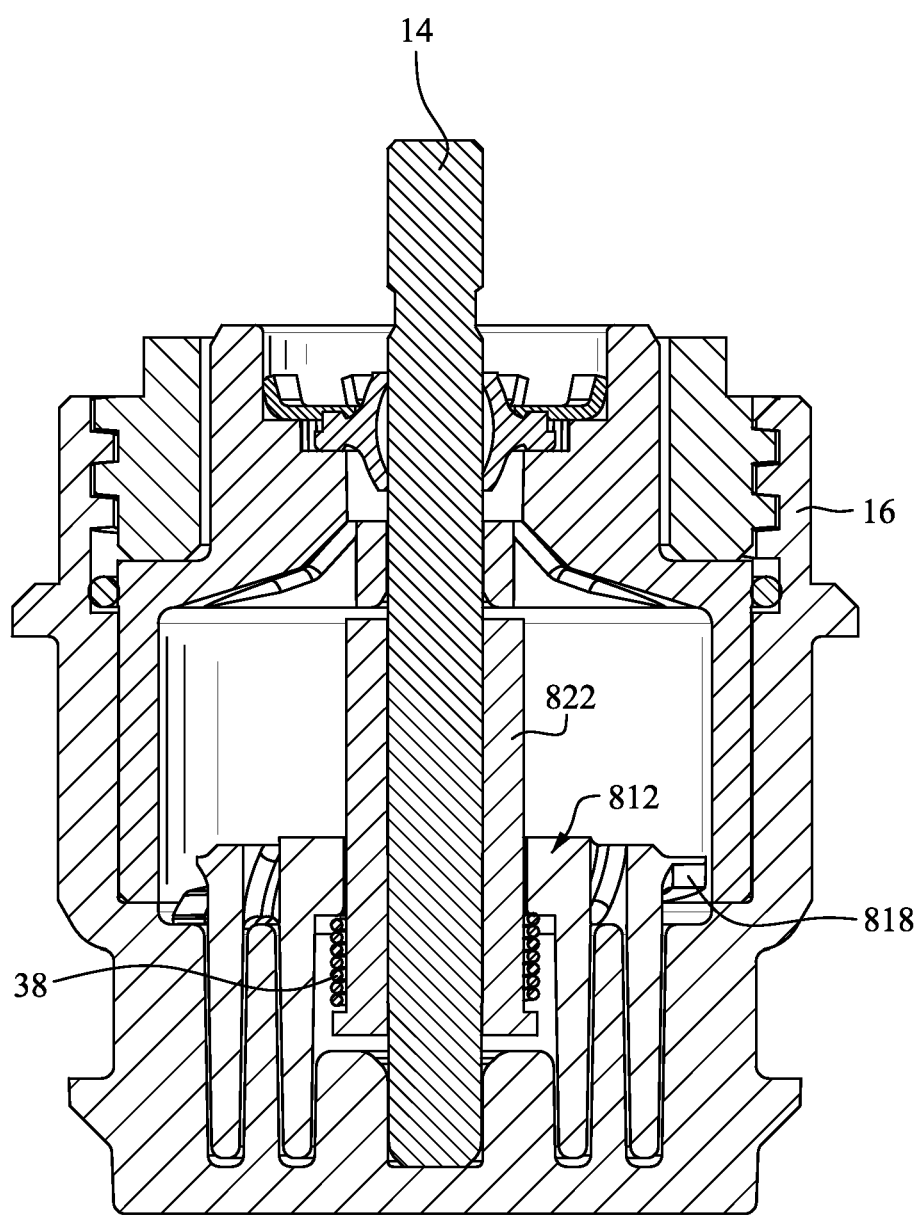
FIG. 32 is a sectional view of the FIG. 29 embodiment with the rotor in a high-braking position.

FIG. 29 is a side view of the device 800 installed in an exemplary rotator sprinkler. Typically, sprinklers operate over a wide range of nozzle sizes and line pressure. FIG. 30 is a vertical cross section of FIG. 29. FIG. 31 shows the brake assembly 800 including the housing 16, shaft 14 and rotor 812. As in previous embodiments, the housing 16 is filled with a high-viscosity silicone fluid. In FIG. 31, the brake is at rest or turning very slowly, and the rotor 812 is in the raised or low-shear position, being biased to that position by the compression spring 38. In the position shown in FIG. 31, the braking torque is at its minimum due to the relatively large clearances between the rotating and stationary members. As a torque is applied to the shaft 14, the rotor 812 turns faster, which causes outside propeller blades 818 (and to a lesser extent, the blades connecting the rotor rings) to push the rotor 812 down against the force of the spring 38. FIG. 32 shows the rotor 812 in its lowermost position, which creates maximum braking by creating large areas with minimal fluid gap. Depending on the torque applied to the shaft 14, the rotor 812 will float vertically between the minimum and maximum positions, finding an axial equilibrium between the spring load and the propeller loads.

Figure 33:
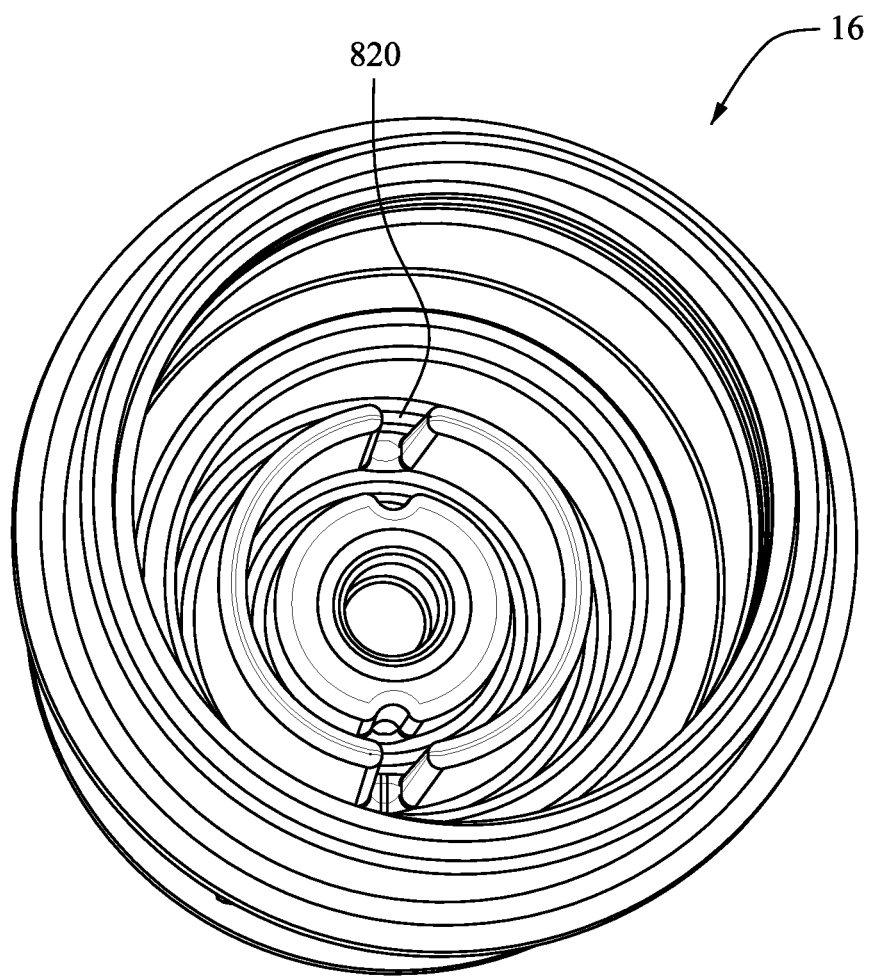
FIG. 33 is a perspective view of the housing in the FIG. 29 embodiment.
Figure 34:
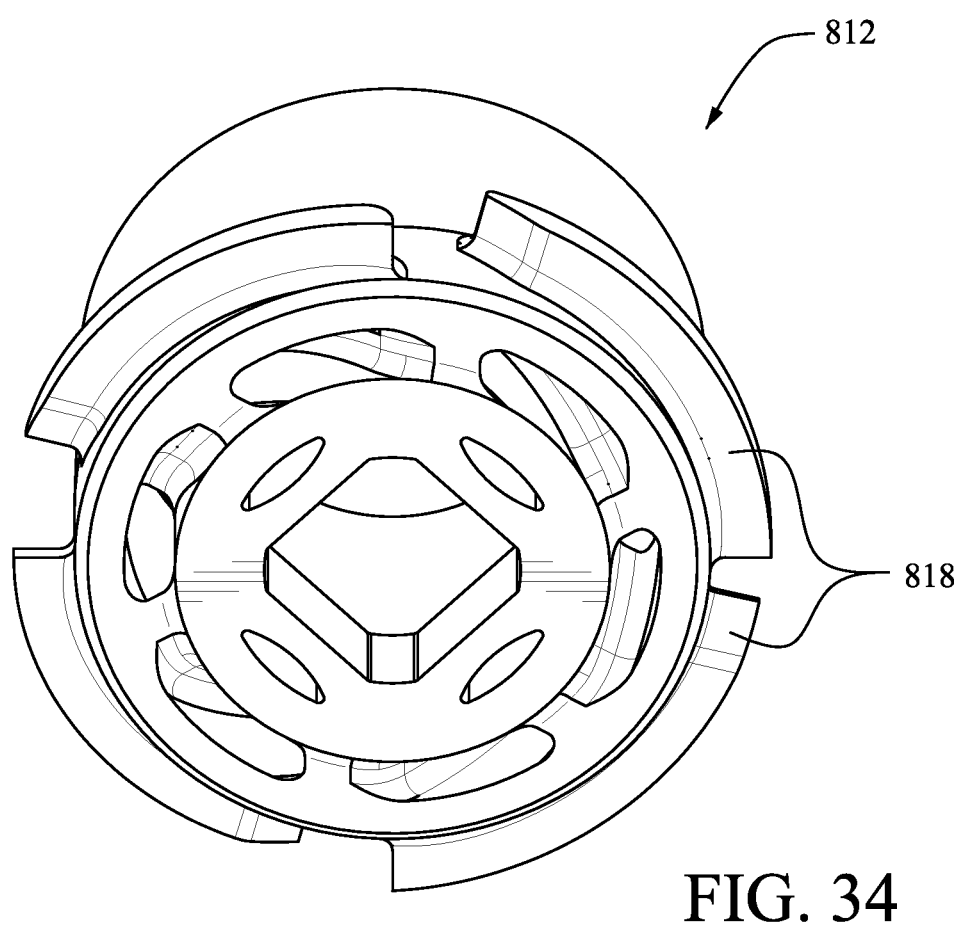
FIGS. 34-36 are perspective views of the rotor in the FIG. 29 embodiment.
Figure 35:
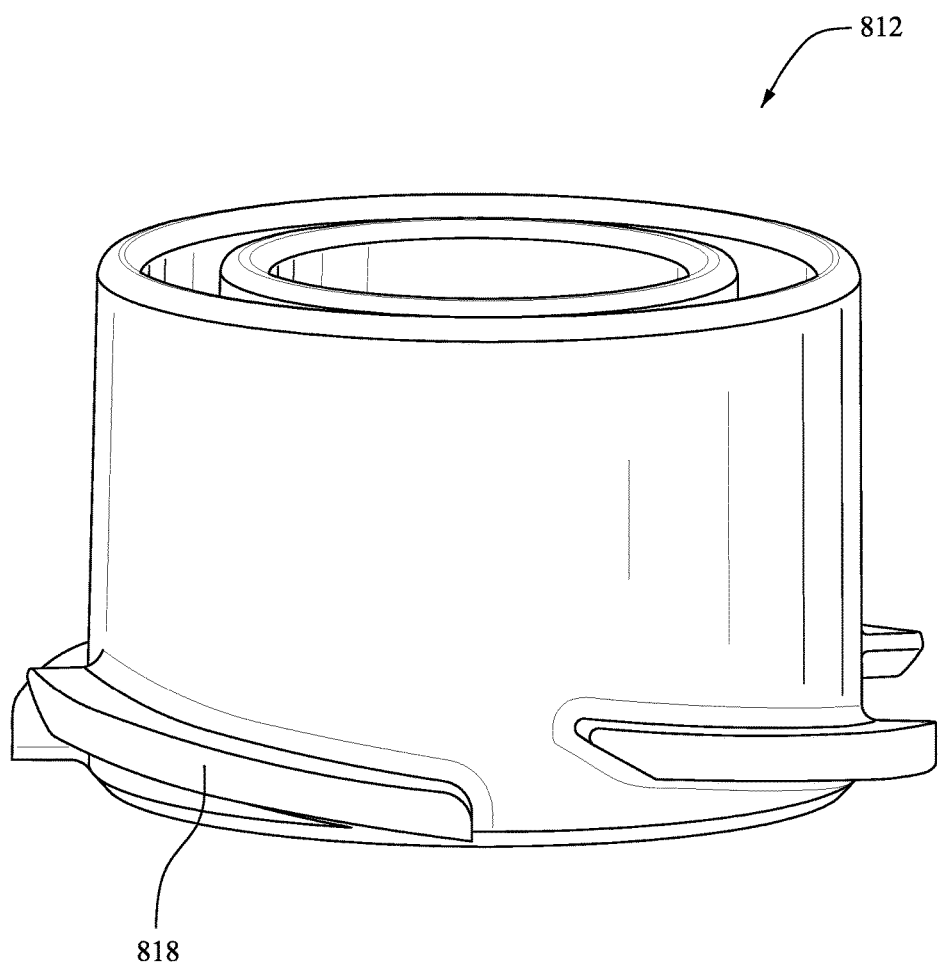
Figure 36:
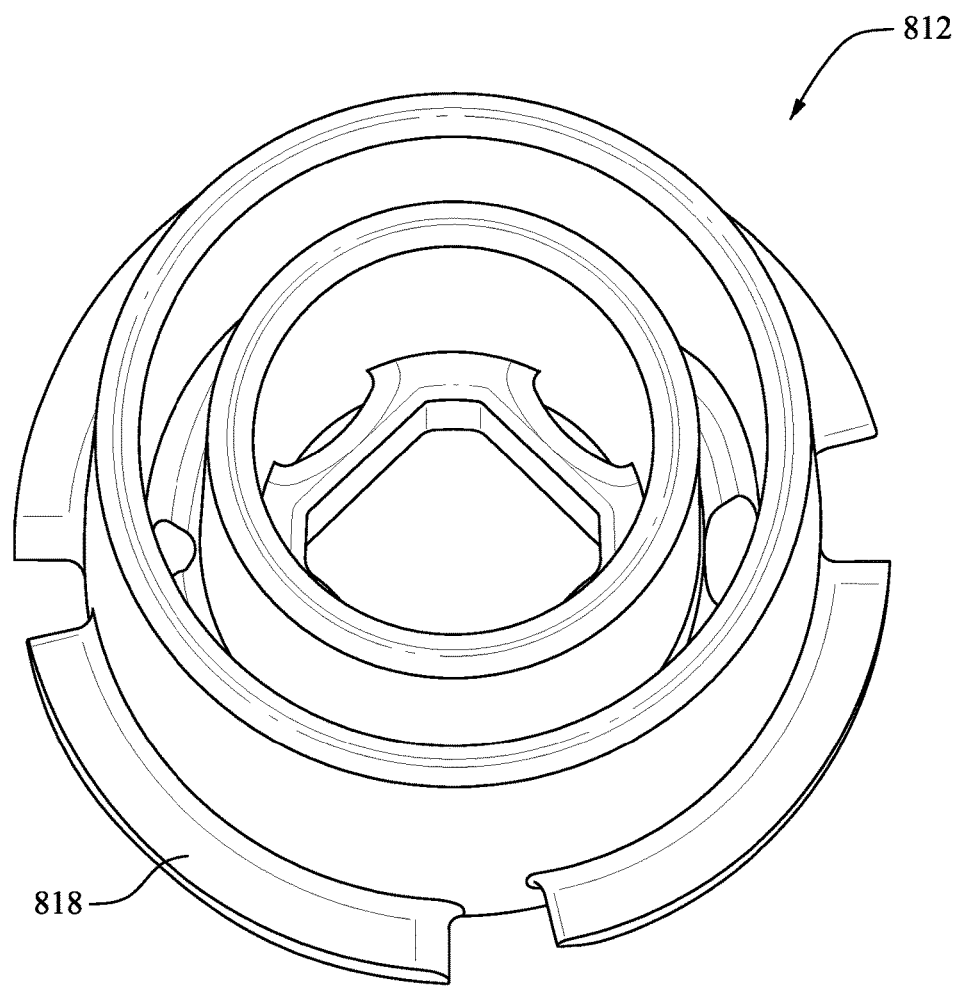

FIG. 33 is a perspective view of the housing 16 showing openings 820 cut in the inner rings to allow fluid to move from one side of the rotor to the other as the rotor moves axially. FIGS. 34-36 are various perspective views of the rotor 812 showing the propeller blades 818. As shown in FIGS. 31 and 32, the hub 822 is preferably machined out of brass square stock and press fit onto the shaft to enable transmission of torque to the rotor while also allowing axial movement of the rotor. The hub 822 also provides support for the compression spring 38.

The exemplary sprinklers of FIGS. 29 and 30 are shown in the position used when water is supplied through a drop tube, but the same sprinkler is often used in the inverted position, for example, on top of a center pivot irrigation machine.

Figure 37:
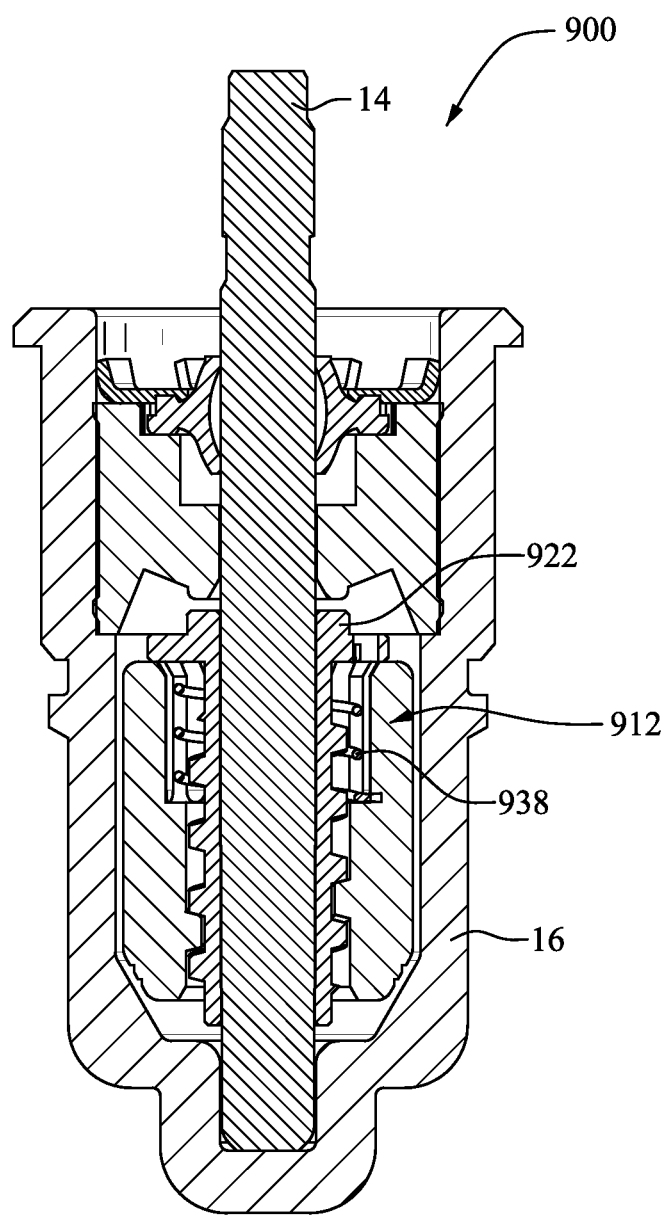
FIG. 37 is a sectional view of an alternative embodiment in an at-rest position and low-speed position.
Figure 38:
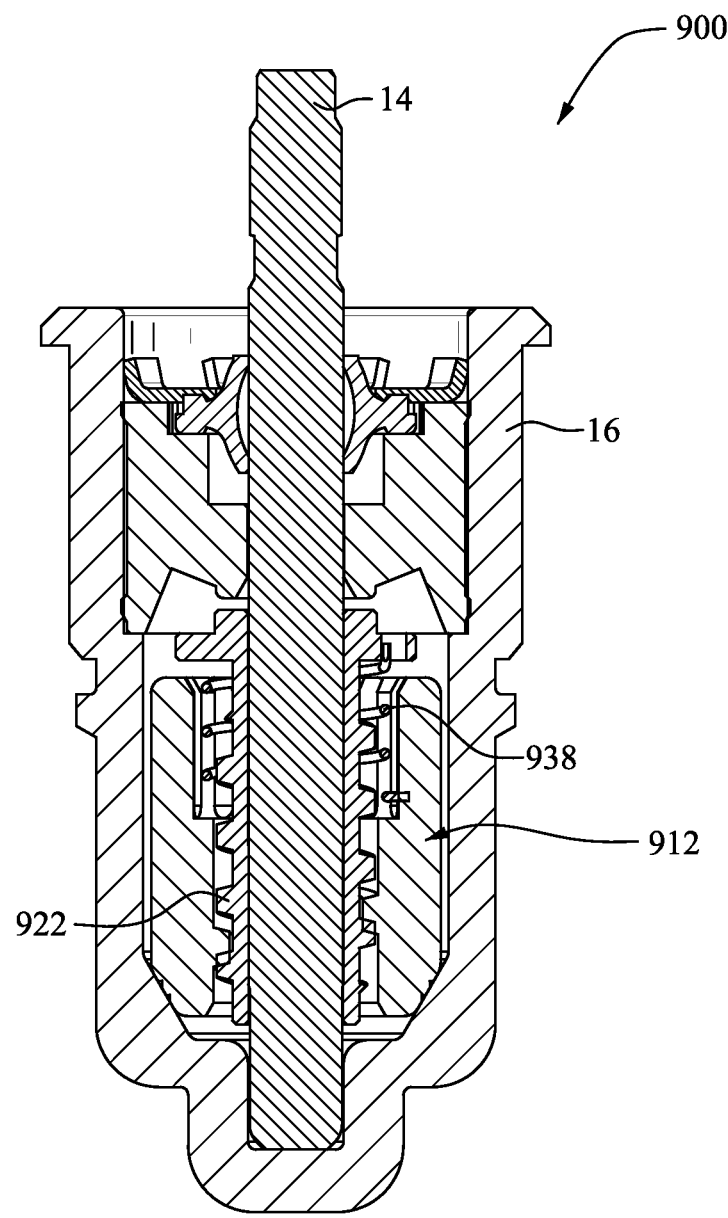
FIG. 38 is a sectional view of the FIG. 37 embodiment in a high-braking position.
Figure 39:
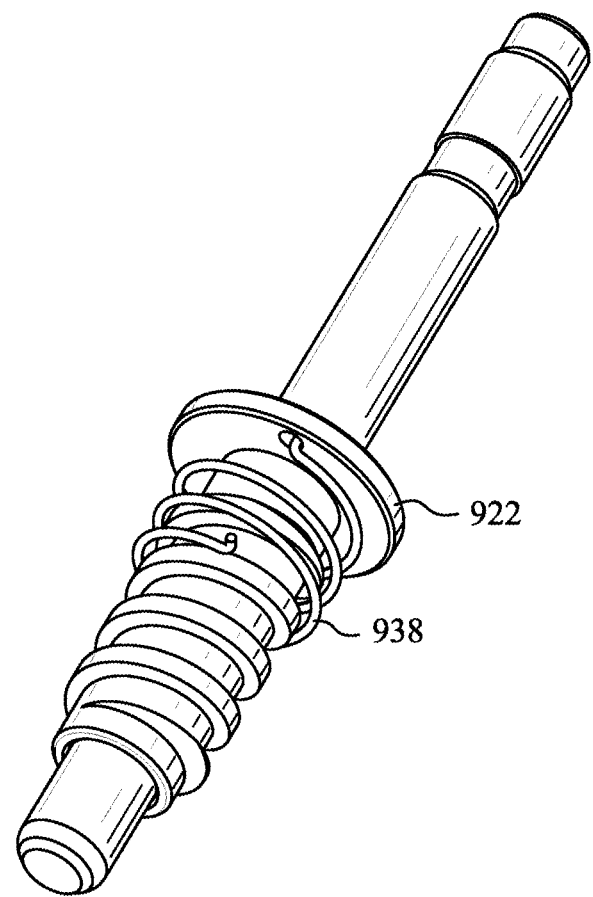
FIG. 39 is a perspective view of the threaded hub and torsion spring in the FIG. 37 embodiment.
Figure 40:
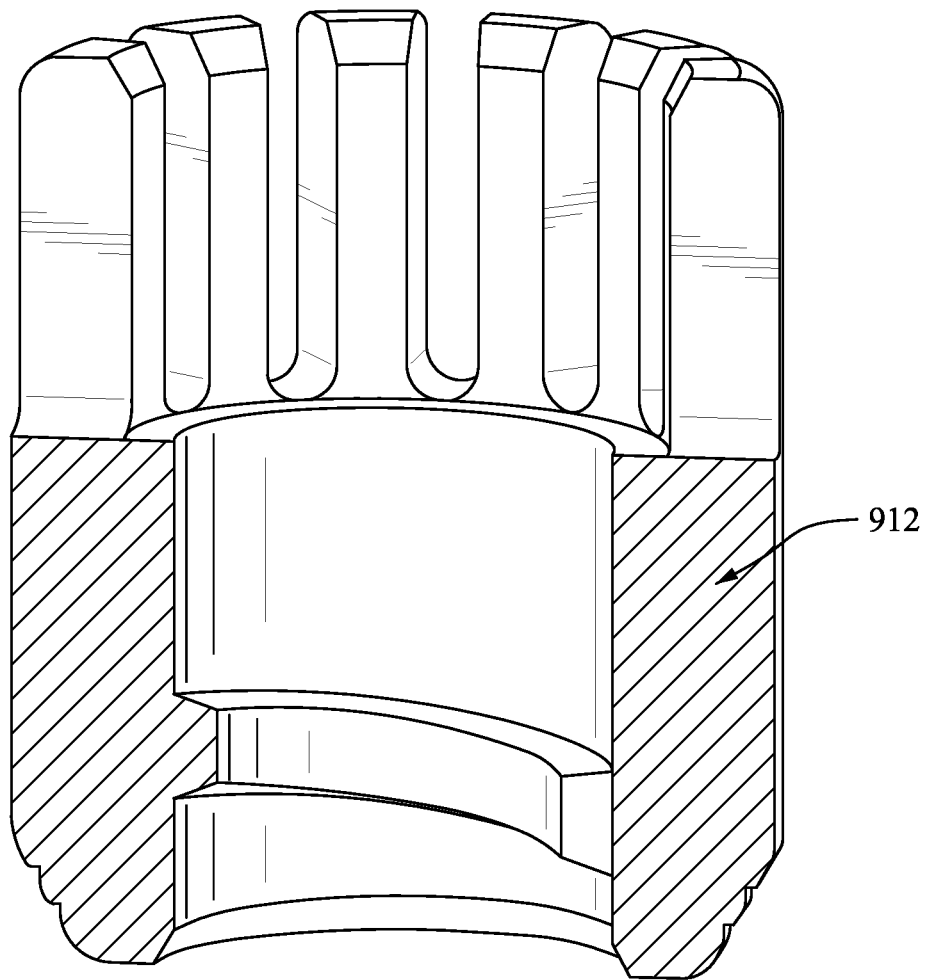
FIGS. 40 and 41 show the rotor of the FIG. 37 embodiment.
Figure 41:
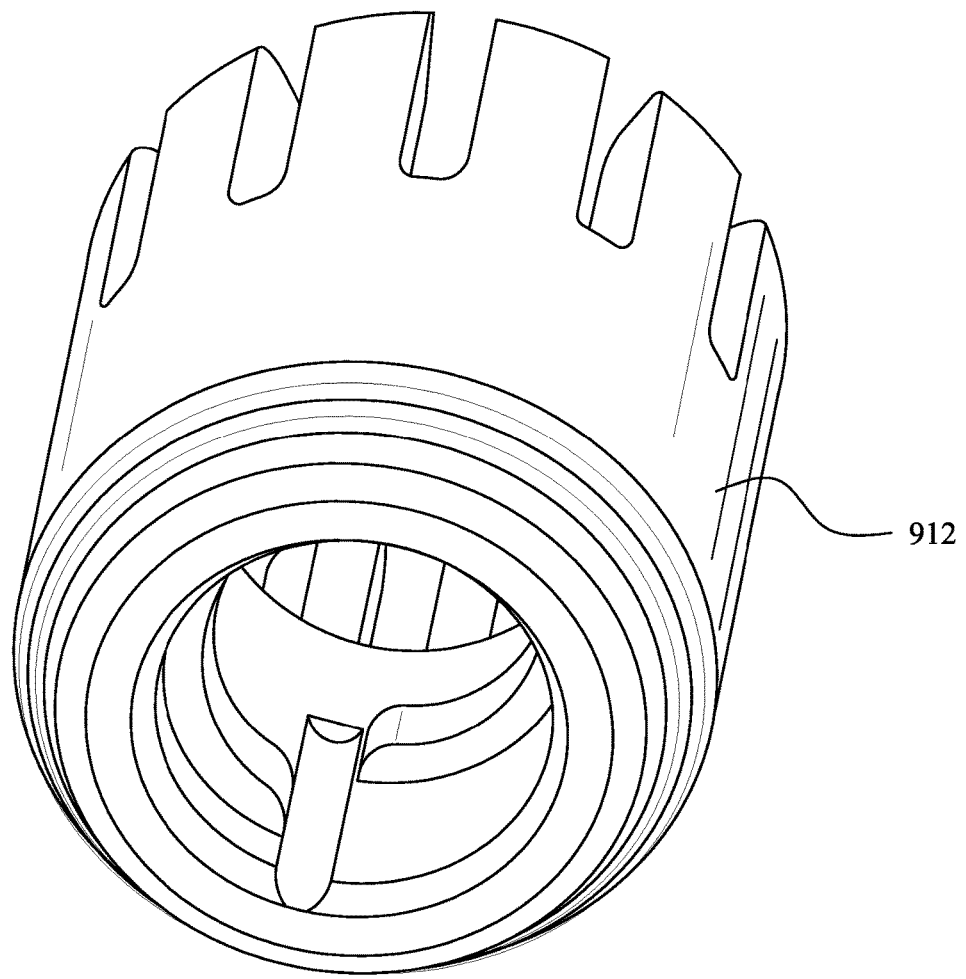
Figure 42:
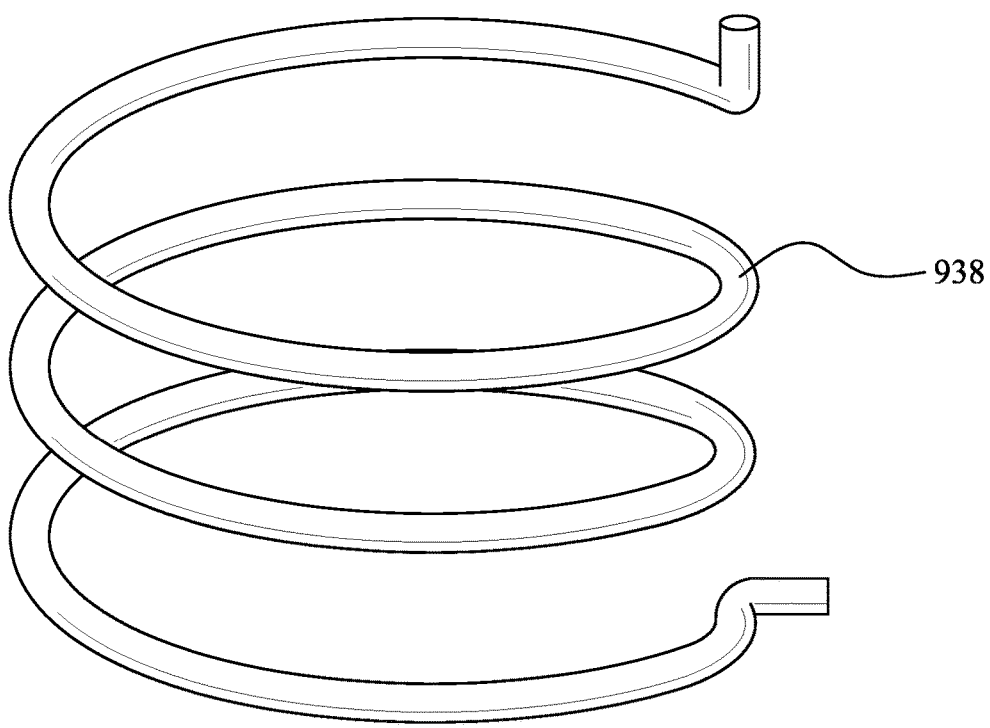
FIG. 42 is a perspective view of the torsion spring in the FIG. 37 embodiment.

FIGS. 37-42 show yet another alternative embodiment. FIG. 37 is a cross section of the assembly 900 when it is in the at-rest position and low-speed position. The unit is filled with a viscous fluid. The rotor 912 is biased to the up position by a torsion spring 938. The threaded hub 922 is press fit to the shaft 14 so that it will rotate with the shaft. As it begins to rotate, the rotor 912 also rotates with the threaded hub 922, until such time that the rotation speed becomes high enough that the viscous shear between the rotor 912 and the housing 16 gets high enough to overcome the torsion spring 938 and the viscous shear between the rotor 912 and the threaded hub 922 to rotate the rotor relative to the threaded hub. This drives the rotor 912 down toward the position shown in FIG. 38. In this position, the lower end of the rotor is contacting the housing, creating mechanical frictional torque in addition to the viscous shear torque. FIG. 39 is a detailed view of the threaded hub 922 and the torsion spring 938. FIGS. 40 and 41 are different views of the rotor 912, and FIG. 42 is a detailed view of the torsion spring 938.

The balancing springs in the various embodiments can be replaced with opposingly oriented magnets to generate the balancing force.

It should be noted that the operation of this device relies on the relative motion between the rotor and the housing. Therefore, it should be recognized that the device could be designed to have the housing rotate about a nonrotating shaft and rotor rather than the described exemplary embodiments where the shaft and rotor rotate within a stationary housing.

The brake assembly can be mounted in various arrangements including ones where the shaft can be driven by a gear, rather than directly by a deflector plate, such as when used in a Big Gun Rotator™.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A rotational speed control device comprising:
a housing containing a viscous fluid;
a shaft disposed in the housing and rotatable relative to the housing;
a radially expanding member coupled with the shaft for rotation with the shaft relative to the housing in the viscous fluid, the radially expanding member being displaceable between a contracted position and an expanded position, wherein the radially expanding member is biased toward the contracted position; and
labyrinth rings disposed on an inside wall of the housing, wherein the radially expanding member comprises labyrinth segments that interact with the labyrinth rings in the expanded position.

2. A rotational speed control device according to claim 1, wherein the radially expanding member further comprises a rotor section fixed to the shaft and segment arms coupled with the rotor section, wherein the labyrinth segments are disposed on an outside surface of the segment arms.

3. A rotational speed control device according to claim 2, wherein the radially expanding member further comprises a spring section between the rotor section and the segment arms, the spring section biasing the radially expanding member toward the contracted position.

4. A rotational speed control device according to claim 3, wherein the radially expanding member further comprises a propeller blade coupled with each of the segment arms.

5. A rotational speed control device according to claim 4, wherein the propeller blades are shaped and positioned to deflect the segment arms against a force of the spring section toward the expanded position by rotation of the shaft by an amount that varies according to a rotation speed of the shaft.

6. A rotational speed control device according to claim 3, wherein the rotor section, the spring section and the segment arms are integral with one another.

7. A rotational speed control device according to claim 1, wherein the radially expanding member is biased toward the contracted position by a spring.

8. A rotational speed control device according to claim 7, wherein the spring is integral with the radially expanding member.

9. A rotational speed control device according to claim 1, wherein the radially expanding member is configured such that the radially expanding member is spaced a first distance from an inside wall of the housing in the contracted position and a second distance from the inside wall of the housing in the expanded position, and wherein the second distance is smaller than the first distance.

10. A rotational speed control device comprising:
a housing containing a viscous fluid;
a shaft disposed in the housing and rotatable relative to the housing; and
a radially expanding member coupled with the shaft for rotation with the shaft relative to the housing in the viscous fluid, the radially expanding member being displaceable between a contracted position and an expanded position, wherein the radially expanding member is biased toward the contracted position, wherein the radially expanding member comprises:
a hub secured to the shaft;
at least one brake shoe coupled with the hub, wherein the brake shoe is radially displaceable in the housing relative to the hub; and
a spring connecting the brake shoe to the hub.

11. A rotational speed control device according to claim 10, wherein the radially expanding member comprises two brake shoes.

12. A rotational speed control device according to claim 11, wherein the brake shoes comprise exterior surfaces that are curved substantially corresponding to an inside wall of the housing, and wherein the brake shoes are pivotable relative to the hub via the spring connecting each of the brake shoes to the hub.

13. A rotational speed control device according to claim 12, wherein leading edges of the brake shoes are shaped such that the brake shoes are pivoted radially outward by rotation of the shaft by an amount that varies according to a rotation speed of the shaft.

14. A rotational speed control device according to claim 13, wherein the leading edges of the brake shoes are tapered.

15. A rotational speed control device according to claim 10, wherein the spring is integral with the hub and the brake shoe.

16. A rotational speed control device according to claim 10, wherein a leading edge of the brake shoe is shaped such that the brake shoe is pivoted radially outward by rotation of the shaft by an amount that varies according to a rotation speed of the shaft.

* * * * *